United States Patent
Chickering et al.

(10) Patent No.: US 7,930,353 B2
(45) Date of Patent: Apr. 19, 2011

(54) TREES OF CLASSIFIERS FOR DETECTING EMAIL SPAM

(75) Inventors: David M. Chickering, Bellevue, WA (US); Geoffrey J. Hulten, Lynnwood, WA (US); Robert L. Rounthwaite, Fall City, WA (US); Christopher A. Meek, Kirkland, WA (US); David E. Heckerman, Bellevue, WA (US); Joshua T. Goodman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 793 days.

(21) Appl. No.: 11/193,691

(22) Filed: Jul. 29, 2005

(65) Prior Publication Data

US 2007/0038705 A1    Feb. 15, 2007

(51) Int. Cl.
*G06F 15/16* (2006.01)
(52) U.S. Cl. ............... 709/206; 709/225; 726/22; 707/5
(58) Field of Classification Search .................. 709/206; 726/22; 707/5
See application file for complete search history.

(56) References Cited

U.S. PATENT DOCUMENTS

| | | |
|---|---|---|
| 5,377,354 A | 12/1994 | Scannell et al. |
| 5,459,717 A | 10/1995 | Mullan et al. |
| 5,619,648 A | 4/1997 | Canale et al. |
| 5,638,487 A | 6/1997 | Chigier |
| 5,704,017 A | 12/1997 | Heckerman et al. |
| 5,805,801 A | 9/1998 | Holloway et al. |
| 5,835,087 A | 11/1998 | Herz et al. |
| 5,884,033 A | 3/1999 | Duvall et al. |
| 5,905,859 A | 5/1999 | Holloway et al. |
| 5,911,776 A | 6/1999 | Guck |
| 5,930,471 A | 7/1999 | Milewski et al. |
| 5,999,932 A | 12/1999 | Paul |
| 6,003,027 A | 12/1999 | Prager |
| 6,023,723 A | 2/2000 | McCormick et al. |
| 6,041,321 A | 3/2000 | Fabbrizio et al. |
| 6,041,324 A | 3/2000 | Earl et al. |
| 6,047,242 A | 4/2000 | Benson |

(Continued)

FOREIGN PATENT DOCUMENTS

CN    1350247 A    5/2002

(Continued)

OTHER PUBLICATIONS

OA dated Oct. 8, 2008 for U.S. Appl. No. 11/743,466, 43 pages.

(Continued)

*Primary Examiner* — Kyung-Hye Shin
(74) *Attorney, Agent, or Firm* — Lee & Hayes, PLLC

(57) ABSTRACT

Decision trees populated with classifier models are leveraged to provide enhanced spam detection utilizing separate email classifiers for each feature of an email. This provides a higher probability of spam detection through tailoring of each classifier model to facilitate in more accurately determining spam on a feature-by-feature basis. Classifiers can be constructed based on linear models such as, for example, logistic-regression models and/or support vector machines (SVM) and the like. The classifiers can also be constructed based on decision trees. "Compound features" based on internal and/or external nodes of a decision tree can be utilized to provide linear classifier models as well. Smoothing of the spam detection results can be achieved by utilizing classifier models from other nodes within the decision tree if training data is sparse. This forms a base model for branches of a decision tree that may not have received substantial training data.

20 Claims, 12 Drawing Sheets

U.S. PATENT DOCUMENTS

| | | | |
|---|---|---|---|
| 6,052,709 A | 4/2000 | Paul | |
| 6,072,942 A | 6/2000 | Stockwell et al. | |
| 6,074,942 A | 6/2000 | Lou | |
| 6,101,531 A | 8/2000 | Eggleston et al. | |
| 6,112,227 A | 8/2000 | Heiner | |
| 6,122,657 A | 9/2000 | Hoffman, Jr. et al. | |
| 6,128,608 A | 10/2000 | Barnhill | |
| 6,144,934 A | 11/2000 | Stockwell et al. | |
| 6,157,921 A | 12/2000 | Barnhill | |
| 6,161,130 A * | 12/2000 | Horvitz et al. | 709/206 |
| 6,167,434 A | 12/2000 | Pang | |
| 6,192,114 B1 | 2/2001 | Council | |
| 6,192,360 B1 | 2/2001 | Dumais et al. | |
| 6,195,698 B1 | 2/2001 | Lillibridge et al. | |
| 6,199,102 B1 | 3/2001 | Cobb | |
| 6,199,103 B1 | 3/2001 | Sakaguchi et al. | |
| 6,249,807 B1 | 6/2001 | Shaw et al. | |
| 6,266,692 B1 | 7/2001 | Greenstein | |
| 6,308,273 B1 | 10/2001 | Goertzel et al. | |
| 6,314,421 B1 | 11/2001 | Sharnoff et al. | |
| 6,321,267 B1 | 11/2001 | Donaldson | |
| 6,324,569 B1 | 11/2001 | Ogilvie et al. | |
| 6,327,617 B1 | 12/2001 | Fawcett | |
| 6,330,590 B1 | 12/2001 | Cotten | |
| 6,332,164 B1 | 12/2001 | Jain | |
| 6,351,740 B1 | 2/2002 | Rabinowitz | |
| 6,370,526 B1 | 4/2002 | Agrawal et al. | |
| 6,393,465 B2 | 5/2002 | Leeds | |
| 6,421,709 B1 | 7/2002 | McCormick et al. | |
| 6,424,997 B1 | 7/2002 | Buskirk, Jr. et al. | |
| 6,427,141 B1 | 7/2002 | Barnhill | |
| 6,434,600 B2 | 8/2002 | Waite et al. | |
| 6,449,635 B1 | 9/2002 | Tilden, Jr. et al. | |
| 6,453,327 B1 | 9/2002 | Nielsen | |
| 6,477,551 B1 | 11/2002 | Johnson et al. | |
| 6,484,197 B1 | 11/2002 | Donohue | |
| 6,484,261 B1 | 11/2002 | Wiegel | |
| 6,505,250 B2 | 1/2003 | Freund et al. | |
| 6,546,390 B1 | 4/2003 | Pollack et al. | |
| 6,546,416 B1 | 4/2003 | Kirsch | |
| 6,592,627 B1 | 7/2003 | Agrawal et al. | |
| 6,615,242 B1 | 9/2003 | Riemers | |
| 6,618,747 B1 | 9/2003 | Flynn et al. | |
| 6,633,855 B1 | 10/2003 | Auvenshine | |
| 6,643,686 B1 | 11/2003 | Hall | |
| 6,654,787 B1 | 11/2003 | Aronson et al. | |
| 6,684,201 B1 | 1/2004 | Brill | |
| 6,691,156 B1 | 2/2004 | Drummond et al. | |
| 6,701,350 B1 | 3/2004 | Mitchell | |
| 6,701,440 B1 | 3/2004 | Kim et al. | |
| 6,704,772 B1 | 3/2004 | Ahmed et al. | |
| 6,728,690 B1 | 4/2004 | Meek et al. | |
| 6,732,149 B1 | 5/2004 | Kephart | |
| 6,732,157 B1 | 5/2004 | Gordon et al. | |
| 6,732,273 B1 | 5/2004 | Byers | |
| 6,742,047 B1 | 5/2004 | Tso | |
| 6,748,422 B2 | 6/2004 | Morin et al. | |
| 6,751,348 B2 | 6/2004 | Buzuloiu et al. | |
| 6,757,830 B1 | 6/2004 | Tarbotton et al. | |
| 6,768,991 B2 | 7/2004 | Hearnden | |
| 6,775,704 B1 | 8/2004 | Watson et al. | |
| 6,779,021 B1 | 8/2004 | Bates et al. | |
| 6,785,820 B1 | 8/2004 | Muttik et al. | |
| 6,842,773 B1 | 1/2005 | Ralston et al. | |
| 6,853,749 B2 | 2/2005 | Watanabe et al. | |
| 6,868,498 B1 | 3/2005 | Katsikas | |
| 6,892,193 B2 * | 5/2005 | Bolle et al. | 706/20 |
| 6,901,398 B1 | 5/2005 | Horvitz et al. | |
| 6,915,334 B1 | 7/2005 | Hall | |
| 6,920,477 B2 | 7/2005 | Mitzenmacher | |
| 6,928,465 B2 | 8/2005 | Earnest | |
| 6,957,259 B1 | 10/2005 | Malik | |
| 6,971,023 B1 | 11/2005 | Makinson et al. | |
| 6,990,485 B2 * | 1/2006 | Forman et al. | 1/1 |
| 7,003,555 B1 | 2/2006 | Jungck | |
| 7,032,030 B1 | 4/2006 | Codignotto | |
| 7,039,949 B2 | 5/2006 | Cartmell et al. | |
| 7,051,077 B2 | 5/2006 | Lin | |
| 7,072,942 B1 | 7/2006 | Maller | |
| 7,117,358 B2 | 10/2006 | Bandini et al. | |
| 7,146,402 B2 | 12/2006 | Kucherawy | |
| 7,155,243 B2 | 12/2006 | Baldwin et al. | |
| 7,155,484 B2 | 12/2006 | Malik | |
| 7,188,369 B2 | 3/2007 | Ho et al. | |
| 7,206,814 B2 | 4/2007 | Kirsch | |
| 7,219,148 B2 | 5/2007 | Rounthwaite et al. | |
| 7,249,162 B2 | 7/2007 | Rounthwaite et al. | |
| 7,263,607 B2 | 8/2007 | Ingerman et al. | |
| 7,287,060 B1 | 10/2007 | McCown et al. | |
| 7,293,063 B1 | 11/2007 | Sobel | |
| 7,320,020 B2 | 1/2008 | Chadwick et al. | |
| 7,321,922 B2 * | 1/2008 | Zheng et al. | 709/206 |
| 7,359,941 B2 | 4/2008 | Doan et al. | |
| 7,366,761 B2 | 4/2008 | Murray et al. | |
| 7,574,409 B2 * | 8/2009 | Patinkin | 706/12 |
| 7,711,779 B2 | 5/2010 | Goodman et al. | |
| 2001/0039575 A1 | 11/2001 | Freund et al. | |
| 2001/0046307 A1 | 11/2001 | Wong | |
| 2001/0049745 A1 | 12/2001 | Schoeffler | |
| 2002/0016956 A1 | 2/2002 | Fawcett | |
| 2002/0059425 A1 | 5/2002 | Belfiore et al. | |
| 2002/0073157 A1 | 6/2002 | Newman et al. | |
| 2002/0091738 A1 | 7/2002 | Rohrabaugh et al. | |
| 2002/0124025 A1 | 9/2002 | Janakiraman et al. | |
| 2002/0129111 A1 | 9/2002 | Cooper | |
| 2002/0147782 A1 | 10/2002 | Dimitrova et al. | |
| 2002/0174185 A1 | 11/2002 | Rawat et al. | |
| 2002/0184315 A1 | 12/2002 | Earnest | |
| 2002/0199095 A1 | 12/2002 | Bandini et al. | |
| 2003/0009495 A1 | 1/2003 | Adjaoute | |
| 2003/0009698 A1 | 1/2003 | Lindeman et al. | |
| 2003/0016872 A1 | 1/2003 | Sun | |
| 2003/0037074 A1 | 2/2003 | Dwork et al. | |
| 2003/0041126 A1 | 2/2003 | Buford et al. | |
| 2003/0088627 A1 | 5/2003 | Rothwell et al. | |
| 2003/0149733 A1 | 8/2003 | Capiel | |
| 2003/0167311 A1 | 9/2003 | Kirsch | |
| 2003/0191969 A1 | 10/2003 | Katsikas | |
| 2003/0200541 A1 | 10/2003 | Cheng et al. | |
| 2003/0204569 A1 | 10/2003 | Andrews et al. | |
| 2003/0229672 A1 | 12/2003 | Kohn | |
| 2004/0003283 A1 | 1/2004 | Goodman et al. | |
| 2004/0015554 A1 | 1/2004 | Wilson | |
| 2004/0019650 A1 | 1/2004 | Auvenshine | |
| 2004/0019651 A1 | 1/2004 | Andaker | |
| 2004/0054887 A1 | 3/2004 | Paulsen, Jr. et al. | |
| 2004/0059697 A1 | 3/2004 | Forman | |
| 2004/0073617 A1 * | 4/2004 | Milliken et al. | 709/206 |
| 2004/0083270 A1 | 4/2004 | Heckerman et al. | |
| 2004/0093371 A1 | 5/2004 | Burrows et al. | |
| 2004/0139160 A1 | 7/2004 | Wallace et al. | |
| 2004/0139165 A1 | 7/2004 | McMillan et al. | |
| 2004/0148330 A1 | 7/2004 | Alspector et al. | |
| 2004/0177120 A1 | 9/2004 | Kirsch | |
| 2004/0199585 A1 | 10/2004 | Wang | |
| 2004/0199594 A1 | 10/2004 | Radatti et al. | |
| 2004/0210640 A1 | 10/2004 | Chadwick et al. | |
| 2004/0215977 A1 | 10/2004 | Goodman et al. | |
| 2004/0255122 A1 | 12/2004 | Ingerman et al. | |
| 2004/0260776 A1 | 12/2004 | Starbuck et al. | |
| 2005/0015455 A1 | 1/2005 | Liu | |
| 2005/0021649 A1 | 1/2005 | Goodman et al. | |
| 2005/0041789 A1 | 2/2005 | Warren-Smith et al. | |
| 2005/0050150 A1 | 3/2005 | Dinkin | |
| 2005/0060643 A1 | 3/2005 | Glass et al. | |
| 2005/0076084 A1 | 4/2005 | Loughmiller et al. | |
| 2005/0080855 A1 | 4/2005 | Murray | |
| 2005/0080889 A1 | 4/2005 | Malik et al. | |
| 2005/0081059 A1 | 4/2005 | Bandini et al. | |
| 2005/0091320 A1 | 4/2005 | Kirsch et al. | |
| 2005/0091321 A1 | 4/2005 | Daniell et al. | |
| 2005/0097174 A1 | 5/2005 | Daniell | |
| 2005/0102366 A1 | 5/2005 | Kirsch | |
| 2005/0108340 A1 * | 5/2005 | Gleeson et al. | 709/206 |
| 2005/0114452 A1 | 5/2005 | Prakash | |
| 2005/0120019 A1 | 6/2005 | Rigoutsos et al. | |
| 2005/0159136 A1 | 7/2005 | Rouse et al. | |

| | | | |
|---|---|---|---|
| 2005/0160148 | A1 | 7/2005 | Yu |
| 2005/0165895 | A1 | 7/2005 | Rajan et al. |
| 2005/0182735 | A1 | 8/2005 | Zager et al. |
| 2005/0188023 | A1 | 8/2005 | Doan et al. |
| 2005/0198270 | A1 | 9/2005 | Rusche et al. |
| 2005/0204005 | A1 | 9/2005 | Purcell et al. |
| 2005/0204006 | A1 | 9/2005 | Purcell et al. |
| 2005/0204159 | A1 | 9/2005 | Davis et al. |
| 2005/0228899 | A1 | 10/2005 | Wendkos et al. |
| 2006/0015942 | A1 | 1/2006 | Judge et al. |
| 2006/0031303 | A1 | 2/2006 | Pang |
| 2006/0031306 | A1 | 2/2006 | Haverkos |
| 2006/0036693 | A1 | 2/2006 | Hulten et al. |
| 2006/0036701 | A1 | 2/2006 | Bulfer et al. |
| 2006/0123083 | A1 | 6/2006 | Goutte et al. |
| 2006/0168017 | A1 | 7/2006 | Stern et al. |
| 2006/0265498 | A1 | 11/2006 | Turgeman et al. |
| 2007/0101423 | A1* | 5/2007 | Oliver et al. .................. 726/22 |
| 2007/0118759 | A1 | 5/2007 | Sheppard |
| 2007/0130350 | A1 | 6/2007 | Alperovitch et al. |
| 2007/0130351 | A1 | 6/2007 | Alperovitch et al. |
| 2007/0133034 | A1 | 6/2007 | Jindal et al. |
| 2007/0208856 | A1 | 9/2007 | Rounthwaite et al. |
| 2008/0016579 | A1 | 1/2008 | Pang |
| 2008/0104186 | A1 | 5/2008 | Wieneke et al. |
| 2009/0157708 | A1 | 6/2009 | Bandini et al. |

FOREIGN PATENT DOCUMENTS

| | | |
|---|---|---|
| EP | 413 537 | 2/1991 |
| EP | 413537 | 2/1991 |
| EP | 0413537 A2 | 2/1991 |
| EP | 720 333 | 7/1996 |
| EP | 720333 | 7/1996 |
| EP | 1376427 | 3/2003 |
| EP | 1300997 | 4/2003 |
| EP | 1376427 | 1/2004 |
| EP | 1376427 A2 | 1/2004 |
| JP | 10074172 A | 3/1998 |
| JP | 2000163341 A | 6/2000 |
| JP | 2001505371 | 4/2001 |
| JP | 2002149611 A | 5/2002 |
| JP | 2002164887 A | 6/2002 |
| JP | 2002330175 A | 11/2002 |
| JP | 2002537727 | 11/2002 |
| JP | 2003115925 A | 4/2003 |
| JP | 2003125005 A | 4/2003 |
| TW | 519591 | 2/2003 |
| TW | 520483 | 2/2003 |
| TW | 521213 | 2/2003 |
| WO | WO96/35994 | 11/1996 |
| WO | WO9635994 A1 | 11/1996 |
| WO | WO9910817 A1 | 3/1999 |
| WO | WO9937066 A1 | 7/1999 |
| WO | 9967731 | 12/1999 |
| WO | WO9967731 | 12/1999 |
| WO | WO0146872 A1 | 6/2001 |
| WO | WO0219069 A2 | 3/2002 |
| WO | WO0223390 A2 | 3/2002 |
| WO | WO0230054 A1 | 4/2002 |
| WO | WO 02/071286 | 9/2002 |
| WO | WO02071286 | 9/2002 |
| WO | WO02071286 A2 | 9/2002 |
| WO | WO02082226 A2 | 10/2002 |
| WO | 03/054764 | 7/2003 |
| WO | WO03054764 | 7/2003 |
| WO | WO 2004/059506 | 7/2004 |
| WO | WO2004059206 | 7/2004 |
| WO | WO2004059506 A1 | 7/2004 |

OTHER PUBLICATIONS

OA dated Nov. 28, 2008 for U.S. Appl. No. 10/799,455, 53 pages.
OA dated Nov. 6, 2008 for U.S. Appl. No. 10/799,992, 46 pages.
OA dated Jan. 16, 2009 for U.S. Appl. No. 10/917,077, 34 pages.
Allman, "Spam, Spam, Spam, Spam, Spam, the FTC, and Spam" Queue, Sep. 2003, pp. 62-69, vol. 1 Issue 6, ACM.
Androutsppoulos, et al., "An Experimental Cmparison of Naive Bayesain and Keywork-Based Anti-Spam Filtering with Personal E-mail Messges", Proceedings of the 23rd ACM SIGIR Conference, pp. 160-167, 2000.
Androutsopoulos, Learning to Filter Spam E-Mail: A Comparison of a Naive Bayesian and a Memory-Based Approach; 4th PKDD's Workshop on Machine Learning and Textual Information Access, 20003 13 pages.
Argamon, et al., "Routing documents according to style"; In First International Workshop on Innovative Information Systems, 1998. 8 pages.
Balter, et al., "Bifrost Inbox Organizer: Giving users control over the inbox"; NordiCHI Oct. 2, 2002, pp. 111-118, Arhus, Denmark.
Bowman, "Hotmail Spam Filters Block Outgoing E-mail"; CNET News.com, Jan. 18, 2001. 3 pages.
Breiman, et al., "Classification and Regression Trees"; Wadsworth & Brooks, Monterey, CA (1984).
Broder, et al., "Syntactic Clustering of the Web" SRC Technical note, Digital Corporation, Jul. 25, 1997. 13 pages.
Byrne, "My Spambook: Was Thwarting UCE Address Culling Programs"; Newsgroups: news.admin.net-abuse.email.comp.mail.sendmail, comp.security.unix; Jan. 19, 1997.
"Clearswift Announces the Most Complete e-Policy-Based Email Content Security Product for Service Providers"; http://www.clearswift.com/news/item.aspx?ID=144. (Oct. 12, 2002).
Cohen, "Learning Rules that Classify E-Mail", In the proceedings of the 1996 AAAI Spring Symposium on Machine Learning in information Access. Downloaded from William Cohen's web page: http:www.research.att.com/ncohen/pubs.html.
Cranor, et al., "Spam!" Communications of the ACM, 1998, pp. 74-83, vol. 41. No. 8.
Cunningham, et al., "A Case-Based Approach to Spam Filtering that Can Track Concept Drift" Trinity College, Dublin, Department of Computer Science, May 13, 2003.
Dwork, et al., "Pricing via Processing or Combatting Junk Mail*"; Prsented at Crypto '92; pp. 1-11.
European Search Report dated Apr. 6, 2006 and mailed Apr. 6, 2006 for EP 04102242, 3 pages.
European Search Report, dated Jun. 9, 2005, mailed Aug. 22, 2005 for European Patent Application Serial No. EP04011978, 12 pages.
European Search Report, EP31087TE900, mailed Nov. 11, 2004.
Fawcett, ""In vivo" spam filtering: A challenge problem for KDD"; SIGKDD Explorations, Dec. 2003. pp. 140-148, vol. 5 Issue 2, ACM.
Federal Trade Commission, "False Claims in Spam"; A report by the FTC's division of marketing practices, Apr. 30, 2003, http://www.ftc.gov/reports/spam/030429spamreport.pdf.
Gee, "Using Latent Semantic Indexing to Filter Spam" Dept. of Computer Science and Engineering, University of Texas-Arlington. 5 pages. Proceedings of the 2003 ACM symposium on Applied Computing. 2003—portal.acm.org.
Graham, "A Plan for Spam, Online!" Aug. 2002, XP002273602, http://www.paulgraham.com/spam.html, retrieved on Mar. 12, 2004.
Graham, "The Future of Spam", Computer Security Journal, CSI Computer Security Institute, vol. X!X, No. 1, Jan. 2003, pp. 1-5.
Hansell, "Internet is Losing Ground in Battle Against Spam"; the New York Times: Technology section, Apr. 22, 2003.
Hayes, "Spam, Spam, Spam, Lovely Spam"; American Scientist Online, Jun. 30, 2003. pp. 1-6. vol. 91.
Hidalgo, "Evaluating Cost-Sensitive Unsolicited Bulk Email Categorization"; SAC 2002, pp. 615-620, ACM Madrid, Spain.
International Search Report dated Jan. 17, 2006, mailed Jan. 31, 2006, for PCT Application Serial No. PCT/ US04/05501, 2 pages.
International Search Report, EP 03 00 6814, mailed Feb. 13, 2004.
lwayama, et al., "Hierarchical Bayesian Clustering for Automatic Text Classification" Natureal Language; 1995; pp. 1322-1327.
Joachims, "Text Categorization with Support Vector Machines: Learning with Many Relevant Features", LS-8 Report 23, Nov. 1997, 18 pages.
Joachims, "Transductive Inference for Text Classification using Support Vector Machines", In Proceedings of the 16th International Conference on Machine Learning, 1999. pp. 200-209. Sabn Francisico, USA.
Kawamata, et al., "Internet Use Limitation", Started by Company, Part II. Full Monitoring/Limiting Software, Nikkei Computer, No. 469, Nikkei Business Publications, Inc, May 10, 1999, pp. 87-91.

Knowles, et al. "Stop, in the Name of Spam". Communications of the ACM, Nov. 1998, pp. 11-14, vol. 41 No. 11, ACM.

Koller, et al., "Hierarchically classifying documents using very few words"; In ICML-97: Proceedings of the Fourteenth International Conference on Machine Learning; San Francisco, CA; Morgan Kaufmann 1997; 9 pages.

Lewis, "Representation and learning in information retrieval" University of Massachusetts, 1992.

Lewis, et al., "A Comparison of Two Learning Algorithms for Text Categorization", Third Annual Symposium on Document Analysis and Information Retrieval; Apr. 11-13, 1994; pp. 81-93.

Lewis, "An Evaluation of Phrasal and Clustered Representations on a Text Categorization Task"; 15th Annual International SIGIR '92; Denmark 1992; pp. 37-50.

Li, et al., "Classification of Text Documents", Department of Computer Science and Engineering, Michigan State University, E. Lansing, Michigan, The Computer Journal, vol. 41, No. 8, 1998; 537-546.

Li, et al., "Secure Human-Computer Identification against Peeping Attacks (SecHCI): a Survey", Technical Report, Microsoft Research, 2003. 53 pages.

Madigan, "Statistics and the War on Spam", Rutgers University, pp. 1-13, 2003.

Manco, et al., "Towards an Adaptive Mail Classifier"; In Proceedings of Italian Association for Artificial Intelligence Workshop, 2002. 12 pages.

Massey, et al., "Learning Spam: Simple Techniques for Freely-Available Software"; Proceedings of Freenix Track 2003 Usenix Annual Technical Conference, Online, Jun. 9, 2003, pp. 63-76, Berkley CA USA.

"MIME", The Microsoft Computer Dictionary, 5th ed. Redmond, WA; Microsoft Press. May 1, 2002.

Mimoso, "Quick Takes: Imagine Analysis, Filtering Comes to E-mail Security", http://searchsecurity.techtarget.com/originalContent.html (Feb. 5, 2002).

Mitchell, "Machine Learning", Carnegie Mellon Universy, Bayesian Learning, Chapter 6, pp. 180-184, The McGraw-Hill Companies, Inc. cc 1997.

Mock, "An Experimental Framework for Email Categorization and Management" Proceedings of the 24th Annual International ACM SIGIR Conference, pp. 292-293. 2001.

O'Brien, et al., "Spam Filters: Bayes vs. Chi-squared; Letters vs. Words" Proceedings of the 1st international symposium on Information and communication technologies, 2003, pp. 291-296, Dublin, Ireland.

OA dated Jan. 16, 2009 for U.S. Appl. No. 10/917,077, 34 pages.
OA dated Nov. 28, 2008 for U.S. Appl. No. 10/799,455, 53 pages.
OA dated Nov. 6, 2008 for U.S. Appl. No. 10/799,992, 46 pages.
OA dated Oct. 8, 2008 for U.S. Appl. No. 11/743,466, 43 pages.

Palme, et al., "Issues when designing filters in messaging systems", Department of Computer and Systems Sciences, Stockholm University, Royal institute of Technology, Skeppargarten 73, S-115 30, Stockholm, Sweden, Computer Communications; 1996; 99. 95-101.

Pantel, et al., "Spam Cop: A Spam Classification & Organization Program"; In Proceedings AAAI-1998 Workshop on Learning for Text Categorization, 1998. 8 pages.

Partial European Search Report, EP05100847, mailed Jun. 21, 2005, 5 pages.

Quinlan, "C4.5: Programs for Machine Learning"; Morgan Kaufmann, San Francisco, CA (1993).

Rennie, "ifile: An Application of Machine Learning to E-Mail Filtering"; Proceedings of the KDD-2000 Workshop on Text Mining, Sixth ACM SIGKDD International Conference on Knowledge Discovery and Data Mining, 2000. 6 pages.

Rosen, "E-mail Classification in the Haystack Framework" Massachusetts Institute of Technology, Feb. 2003.

Shaami, et al., "A Bayesian Approach to Filtering Junk E-Mail" Sanford University, http://citeseerx.ist.psu.edu/viewdoc/summary?doi=10.1.1.48.1254, 1998.

Sahami, "Learning Limited Dependence Bayesian Classifiers" in KDD-96: Proceedings of the Second International Conference on Knowledge Discovery and Data Mining, AAAI Presss, 1996, Menlo Park, CA, pp. 335-338.

Schutze, et al., "A Comparison of Classifiers and Document Representations for the Routing Problem", Proceedings of the 18th Annual International ACM SIGIR Conference on Research and Development in Information Retrieval, Seattle, WA Jul. 9-13, 1995; pp. 229-237.

Sebastiani, "Machine Learning in Automated Text Categorization"; ACM Computing Surveys, vol. 34 Issue 1, pp. 1-47, 2002.

Segal, et al., "SwiftFile: An Intelligent Assistant for Organizing E-Mail", IBM Thomas J. Watson Reseach Center. Copyright 2000, American Association for Artificial Intelligence (www.aaal.org.

Shimmin, B.F., "Effective use of electronic post", FENIX Publishing House, Rostov-na-Donu, 1998, pp. 229-249.

Simard, et al., Using Character Recognition and Segmentation to Tell Computer from Humans, International Conference on Document Analysis and Recognition (ICDAR), IEE Computer Society. Los Alamitos, pp. 418-423, 2003.

Skoll, "How to Make Sure a Human is Sending You Mail", Newsgroups: news.admin.net-abuse.usenet. Nov. 17, 1996.

Spertus, "Smokey: Automatic Recognition of Hostile Messages" Proceedings of the Conference on Innovative Applications in Artificial Intelligence (IAAI), 1997, 8 pages.

Stop, in the Name of Spam, Communications of the ACM, Nov. 1998, pp. 11-14, vol. 41 No. 11, ACM.

Takkinen, et al., "CAFE: A Conceptual Model for Managing Information in Electronic Mail", Laboratory for Intelligent Infomation Systems, Department of Computer and Information Science, Linkoping University, Sweden, Conference on System Sciences, 1998 IEEE.

Turner, et al., "Controlling Spam through Lightweight Currency"; In Proceedings of the Hawaii International Conference on Computer Sciences, Jan. 2004. 9 pages.

Turner, et al., "Payment-Based Email"; 5th International Conference on Software Engineering, Artificial Intelligence, Networking, and Parallel/Distributed Computing, Jun. 2004. 7 pages.

White, "How Computers Work"; QUE Publishing, 204, pp. 238-239.

Wong, "Preventing Spams and Relays" Linux Journal, Dec. 1998, 6 pages, vol. 1998 Issue 56es, Specialized Systems Consultants, Inc.

Wong, "SPF Overview"; Linus Journal, Apr. 2004, 6 pages, vol. 2004 Issue 120, Specialized Systems Consultants, Inc.

Written Opinion of the International Preliminary Examining Authority mailed Nov. 30, 2005 for PCT/US03/41526, 5 pages.

Wu, et al., "A new anti-Spam filter based on data mining and analysis of email security"; Conference Proceedings of the SPIE, Data Mining and Knowledge Discovery Theory, Tools and Technology V, vol. 5098, Apr. 21, 2003, pp. 147-154, Orlando FL USA.

Yang, et al., "A Comparative Study on Feature Selection in Text Categorization" School of Computer Science, Carnegie Melton University, Pittsburgh, PA and Verity, Inc., Sunnyvale, CA; http://citeseerx.ist.psu.edu/viewdoc/summary?doi=10.1.1.32.9956; 1997; 9 pages.

Yang, et al., "An Example-Based Mapping Method for Text Categorization and Retrieval"; ACM Transactions on Information Systems, vol. 12, No. 3, Jul. 1994, pp. 252-277.

How to Obscure Any URL, http:www.pc-help.org/obscure.htm, last viewed on Jan. 18, 2003, 10 pages.

Kohavi, "A study of cross-validation and bootstrap accuracy estimation and model selection", Proceedings of the Fourteenth International Joint Conference on Artificial Intelligence 2 (12), retrieved from <<http://dli.iiit.ac.in/ijcai/IJCAI-95-VOL2/PDF/016/pdf>>, 1995, pp. 1137-1143.

U.S. Appl. No. 10/374,005, filed Feb. 25, 2003, Rounthwaite, et al.
U.S. Appl. No. 10/291,260, filed Nov. 8, 2002, Burrows, et al.
U.S. Appl. No. 10/208,150, filed Jul. 29, 2002, Kristian Andaker.
U.S. Appl. No. 09/893,941, filed Jun. 28, 2001, Horvitz, et al.
U.S. Appl. No. 10/278,591, filed Oct. 23, 2002, Heckerman, et al.
U.S. Appl. No. 10/180,565, filed Jun. 26, 2002, Goodman, et al.
U.S. Appl. No. 09/497,992, filed Feb. 4, 2000, Steven T. Maller.

Cynthia Dwork, et al.; "Pricing Via Processing or Combatting Junk Mail"; Presented at Crypto '92; pp. 1-11.

Thorsten Joachims; "Text Categorization with Support Vector Machines: Learning with Many Relevant Features"; LS-8 Report 23, Nov. 1997, 18 pages.

Daphne Koller, et al.; "Hierarchically Classifying Doucments Using Very Few Words"; In ICML-97: Proceedings of the Fourteenth International Conference on Machine Learning; San Francisco, CA: Morgan Kaufmann 1997; 9 pages.

Ellen Spertus; "Smokey: Automatic Recognition of Hostile Messages"; Proceedings of the Conference on Innovative Applications in Artificial Intelligence (IAAI), 1997, 8 pages.

Hinrich Schutze, et al.; "A Comparison of Classifiers and Document Representations for the Routing Problem"; Proceedings of the 18th Annual International ACM SIGIR Conference on Research and Development in Information Retrieval, Seattle, WA, Jul. 9-13, 1995; pp. 229-237.

Yiming Yang, et al.; "A Comparative Study on Feature Selection in Text Categorization"; School of Computer Science, Carnegie Mellon University, Pittsburgh, PA, and Verity, Inc., Sunnyvale, CA; 9 pages.

Yiming Yang, et al.; "An Example-Based Mapping Method for Text Categorization and Retrieval"; ACM Transactions on Information Systems, vol. 12, No. 3, Jul. 1994, pp. 252-277.

David D. Lewis, et al.; "A Comparison of Two Learning Algorithms for Text Categorization"; Third Annual Symposium on Document Analysis and Information Retrieval; Apr. 11-13, 1994; pp.81-93.

Mehran Sahami; "Learning Limited Dependence Bayesian Classifiers"; In KDD-96: Proceedings of the Second International Conference on Knowledge Discovery and Data Mining; AAAI Press, 1996; Menlo Park, CA; pp. 335-338.

William W. Cohen; "Learning Rules that Classify E-Mail"; In the Proceedings of the 1996 AAAI Spring Symposium on Machine Learning in Information Access. Downloaded from William Cohen's web page: http://www.research.att.com/nwcohen/pubs.html.

Makoto Iwayama, et al.; "Hierarchical Bayesian Clustering for Automatic Text Classifiation"; Natural Language; 1995; pp. 1322-1327.

David D. Lewis; "An Evaluation of Phrasal and Clustered Representations on a Text Categorization Task"; 15th Annual International SIGIR '92; Denmark 1992; pp. 37-50.

Daphne Koller, et al.; "Toward Optimal Feature Selection"; Machine Learning; Proc. of the Thirteenth International Conference, Morgan Kaufmann, 1996, 9 pages.

David Dolan Lewis; "Representation and Learning in Information Retrieval"; University of Massachusetts, 1992.

Tom Mitchell; "Machine Learning"; Carnegie Mellon University, Bayesian Learning, Chapter 6, pp. 180-184.

Y. H. Li, et al.; "Classification of Text Documents"; Department of Computer Science and Engineering, Michigan State University, E. Lansing, Michigan, The Computer Journal, vol. 41, No. 8, 1998; 537-546.

Juha Takkinen, et al.; "CAFE: A Conceptual Model for Managing Information in Electronic Mail"; Laboratory for Intelligent Information Systems, Department of Computer and Information Science, Linkoping University, Sweden, Conference on System Sciences, 1998 IEEE.

Richard B. Segal, et al., "SwiftFile: An Intelligent Assistant for Organizing E-Mail"; IBM Thomas J. Watson Research Center.

Jacob Palme, et al.; "Issues When Designing Filters in Messaging Systems"; Department of Computer and Systems Sciences, Stockholm University, Royal Institute of Technology, Skeppargarten 73, S-115 30, Stockholm, Sweden, Computer Communications; 1996; pp. 95-101.

Mehran Sahami, et al., "A Bayesian Approach to Filtering Junk E-Mail"; Stanford University.

David Madigan, "Statistics and the War on Spam," Rutgers University, pp. 1-13, 2003.

Padraig Cunningham, et al., "A Case-Based Approach to Spam Filtering that Can Track Concept Drift," Trinity College, Dublin,Department of Computer Science, May 13, 2003.

Mark Rosen, "E-mail Classification in the Haystack Framework," Massachusetts Institute of Technology, Feb. 2003.

Thorsten Joachims, Transductive Inference for Text Classification Using Support Vector Machines, In Proceedings of the 16th International Conference on Machine Learning, 1999, pp. 200-209, San Francisco, USA.

Kevin R. Gee, Using Latent Semantic Indexing to Filter Spam, Dept. of Computer Science and Engineering, University of Texas—Arlington, 5 pages, 2003.

Fabrizio Sebastiani. Machine Learning in Automated Text Categorization. ACM Computing Surveys, vol. 34 Issue 1, pp. 1-47, 2002.

I. Androutsopoulos, et al. Learning to Filter Spam E-mail: A Comparison of a Naive Bayesian and a Memory-based Approach. 4th PKDD's Workshop on Machine Learning and Textual Information Access, 2000. 13 pages.

I. Androutsopoulos, J. Koutsias, K.V. Chandrinos, C.D. Spyropoulos. An Experimental Comparison of Naive Bayesian and Keyword-based Anti-spam Filtering with Personal E-mail Messages. Proceedings of the 23rd ACM SIGIR Conference, pp. 160-167, 2000.

P. Pantel and D. Lin. SpamCop: A Spam Classification & Organization Program. In Proc. AAAI-1998 Workshop on Learning for Text Categorization, 1998. 8 pages.

G. Manco, E. Masciari, M. Ruffolo, and A. Tagarelli. Towards an Adaptive Mail Classifier. In Proc. of Italian Association for Artificial Intelligence Workshop, 2002. 12 pages.

Cormac O'Brien, et al., Spam Filters: Bayes vs. Chi-squared; Letters vs. Words, Proceedings of the 1st international symposium on Information and communication technologies, 2003, pp. 291-296, Dublin, Ireland.

Olle Balter, et al., Bifrost Inbox Organizer: Giving users control over the inbox, NordiCHI Oct. 2002, 2002, pp. 111-118, Arhus, Denmark.

Lorrie Faith Cranor, et al., Spam!, Communications of the ACM, 1998, pp. 74-83, vol. 41-No. 8.

John Wong, Preventing Spams and Relays, Linux Journal, Dec. 1998, 6 pages, vol. 1998 Issue 56es, Specialized Systems Consultants, Inc.

Meng Weng Wong, SPF Overview, Linux Journal, Apr. 2004, 6 pages, vol. 2004 Issue 120, Specialized Systems Consultants, Inc.

Stop, in the Name of Spam, Communications of the ACM, Nov. 1998, pp. 11-14, vol. 41 No. 11, ACM.

Eric Allman, Spam, Spam, Spam, Spam, Spam, the FTC, and Spam, Queue, Sep. 2003, pp. 62-69, vol. 1 Issue 6, ACM.

Tom Fawcett, "In vivo" Spam Filtering: A Challenge Problem for KDD, SIGKDD Explorations, Dec. 2003, pp. 140-148, vol. 5 Issue 2, ACM.

J.D.M. Rennie. ifile: An Application of Machine Learning to E-Mail Filtering. Proceedings of the KDD-2000 Workshop on Text Mining, Sixth ACM SIGKDD International Conference on Knowledge Discovery and Data Mining, 2000. 6 pages.

S. Argamon, M. Koppel, and G. Avneri. Routing documents according to style. In First International Workshop on Innovative Information Systems, 1998. 8 pages.

K. Mock. An Experimental Framework for Email Categorization and Management. Proceedings of the 24th Annual International ACM SIGIR Conference, pp. 392-393, 2001.

Jose Maria Gomez Hidalgo, Evaluating Cost-Sensitive Unsolicited Bulk Email Categorization, SAC 2002, 2002, pp. 615-620, ACM, Madrid, Spain.

A.Z. Broder, et al. Syntactic Clustering of the Web. SRC Technical Note, Digital Corporation, Jul. 25, 1997. 13 pages.

P.Y. Simard, et al. Using Character Recognition and Segmentation to Tell Computer from Humans. International Conference on Document Analysis and Recogntion (ICDAR), IEEE Computer Society, Los Alamitos, pp. 418-423, 2003.

S. Li and H. Shum. Secure Human-Computer Identification against Peeping: A Survey. Technical Report, Microsoft Research, 2003. 53 pages.

D.A. Turner and D.M. Havey. Controlling Spam through Lightweight Currency. In Proc. of the Hawaii International Conference on Computer Sciences, Jan. 2004. 9 pages.

D. Turner and N. Deng. Payment-based Email. 5th International Conference on Software Engineering, Artificial Intelligence, Networking, and Parallel/Distributed Computing, Jun. 2004. 7 pages.

D. F. Skoll, How to Make Sure a Human is Sending You Mail, Google, Nov. 17, 1996, 2 pages.

L. M. Bowman, Hotmail Spam Filters Block Outgoing E-Mail, CNET NEWS.COM, Jan. 18, 2001, 3 pages.

European Search Report, EP31087TE900, mailed Nov. 11, 2004.

J. Byrne, My Spamblock, Google, Jan. 19, 1997, 2 pages.

Yu Wu, et al., A New Anti-Spam Filter Based on Data Mining and Analysis of Email Security, Conference Proceedings of the SPIE, Data Mining and Knowledge Discovery Theory, Tools and Technology V, vol. 5098, Apr. 21, 2003, pp. 147-154, Orlando, FL, USA.

Massey, B., et al., Learning Spam: Simple Techniques for Freely-Available Software, Proceedings of Freenix Track 2003 Usenix Annual Technical Conference, Online!, Jun. 9, 2003, pp. 63-76, Berkley, CA, USA.

Graham, P., The Future of Spam, Computer Security Journal, CSI Computer Security Institute, vol. 19, No. 1, Jan. 2003, pp. 1-5.

Graham, P., A Plan for Spam, Online!, Aug. 2002, XP002273602, http://www.paulgraham.com/spam.html, retrieved on Mar. 12, 2004.

Breiman, et al., Classification and Regression Trees Wadsworth & Brooks, Montetrey CA (1984).

Quinlan, C4.5: programs for machine learning Morgan Kaufmann, San Francisco, CA (1993).

Partial European Search Report, EP33823TE900kap, mailed Jun. 21, 2005.

Hayes, Brian."Spam, Spam, Spam, Lovely Spam." American Scientist Online, Jun. 30, 2003, pp. 1-6. vol. 91.

European Search Report, dated Jun. 9, 2005, mailed Aug. 22, 2005 for European Patent Application Serial No. EP04011978, 12 pages.

Written Opinion of the International Preliminary Examining Authority mailed Nov. 30, 2005 for PCT/US03/41526. 5 pages.

International Search Report dated Jan. 17, 2006, mailed Jan. 31, 2006. for PCT Application Serial No. PCT/US04/05501, 2 Pages.

European Search Report dated Apr. 6, 2006 and mailed Apr. 6, 2006 for EP 04102242, 3 pages.

Graham. "The Future of SPAM" (2003) Computer Journal, CSI Computer Security Institute, vol. 19, No. 1, 6 pages.

European Search report dated Feb. 23, 2007, mailed Feb. 28, 2007 for European Patent Application Serial No. 05105308, 4 pages.

European Search Report dated Jul. 5, 2006, mailed Jul. 24, 2006 for European Application No. EP 06 01 2631, 3 pages.

Federal Trade Commission. "False Claims in Spam", A report by the FTC's division of marketing practices, Apr. 30, 2003, http://www.ftc.gov/reports/spam/030429spamreport.pdf.

Hansell. "Internet is losing ground in battle against spam", The New York Times: Technology section, Apr. 22, 2003, 2003.

"MIME", The Microsoft Computer Dictionary. 5th ed. Redmond, WA; Microsoft Press. May 1, 2002.

Ron White, How Computers Work, 2004, QUE Publishing, pp. 238-239.

Michael S. Mimoso, "Quick Takes: Image Analysis, Filtering Comes to E-mail Security", http://searchsecurity.techtarget.com/originalContent.html (Feb. 5, 2002).

"Clearswift Announces the Most Complete e-Policy-Based Email Content Security Product for Service Providers", http://www.clearswift.com/news/item.aspx?ID=144. (Oct. 12, 2002).

* cited by examiner

TREES OF CLASSIFIERS FOR DETECTING EMAIL SPAM

BACKGROUND

The advent of global communications networks such as the Internet has presented commercial opportunities for reaching vast numbers of potential customers. Electronic messaging ("email") is becoming increasingly pervasive as a means for disseminating unwanted advertisements and promotions (also denoted as "spam") to network users. The Radicati Group, Inc., a consulting and market research firm, estimates that as of August 2002, two billion junk email messages are sent each day—this number is expected to triple every two years. Individuals and entities (e.g., businesses, government agencies) are becoming increasingly inconvenienced and oftentimes offended by junk messages. As such, junk email is now or soon will become a major threat to trustworthy computing.

A key technique utilized to thwart junk email is employment of filtering systems/methodologies. One proven filtering technique is based upon a machine learning approach—machine learning filters assign to an incoming message a probability that the message is junk. In this approach, features typically are extracted from two classes of example messages (e.g., junk and non-junk messages), and a learning filter is applied to discriminate probabilistically between the two classes. Since many message features are related to content (e.g., words and phrases in the subject and/or body of the message), such types of filters are commonly referred to as "content-based filters."

Some junk/spam filters are adaptive, which is important in that multilingual users and users who speak rare languages need a filter that can adapt to their specific needs. Furthermore, not all users agree on what is and is not, junk/spam. Accordingly, by employing a filter that can be trained implicitly (e.g., via observing user behavior) the respective filter can be tailored dynamically to meet a user's particular message identification needs.

One approach for filtering adaptation is to request a user(s) to label messages as junk and non-junk. Unfortunately, such manually intensive training techniques are undesirable to many users due to the complexity associated with such training let alone the amount of time required to properly effect such training. In addition, such manual training techniques are often flawed by individual users. For example, subscriptions to free mailing lists are often forgotten about by users and thus, can be incorrectly labeled as junk mail by a default filter. Since most users may not check the contents of a junk folder, legitimate mail is blocked indefinitely from the user's mailbox. Another adaptive filter training approach is to employ implicit training cues. For example, if the user(s) replies to or forwards a message, the approach assumes the message to be non-junk. However, using only message cues of this sort introduces statistical biases into the training process, resulting in filters of lower respective accuracy.

Despite various training techniques, spam or junk filters are far from perfect and, quite often, misclassify electronic messages. Unfortunately, this can result in a few junk messages appearing in the inbox and a few good messages lost in a junk folder. Users may mistakenly open spam messages delivered to their inbox and as a result expose them to lewd or obnoxious content. In addition, they may unknowingly "release" their email address to the spammers via web beacons. Improvements in spam filtering are highly desirable in order to facilitate in reducing or even eliminating these unwanted emails.

SUMMARY

The following presents a simplified summary of the subject matter in order to provide a basic understanding of some aspects of subject matter embodiments. This summary is not an extensive overview of the subject matter. It is not intended to identify key/critical elements of the embodiments or to delineate the scope of the subject matter. Its sole purpose is to present some concepts of the subject matter in a simplified form as a prelude to the more detailed description that is presented later.

The subject matter relates generally to email classification, and more particularly to systems and methods for detecting email spam. Decision trees populated with classifier models are leveraged to provide enhanced spam detection utilizing separate email classifiers for each feature of an email. This provides a higher probability of spam detection through tailoring of each classifier model to facilitate in more accurately determining spam on a feature-by-feature basis. Classifiers can be constructed based on linear models such as, for example, logistic-regression models and/or support vector machines (SVM) and the like. The classifiers can also be constructed based on decision trees. "Compound features" based on internal and/or external nodes of a decision tree can be utilized to provide linear classifier models as well. Smoothing of the spam detection results can be achieved by utilizing classifier models from other nodes within the decision tree if training data is sparse. This forms a base model for branches of a decision tree that may not receive substantial training data.

To the accomplishment of the foregoing and related ends, certain illustrative aspects of embodiments are described herein in connection with the following description and the annexed drawings. These aspects are indicative, however, of but a few of the various ways in which the principles of the subject matter may be employed, and the subject matter is intended to include all such aspects and their equivalents. Other advantages and novel features of the subject matter may become apparent from the following detailed description when considered in conjunction with the drawings.

DETAILED DESCRIPTION

Figure 1:
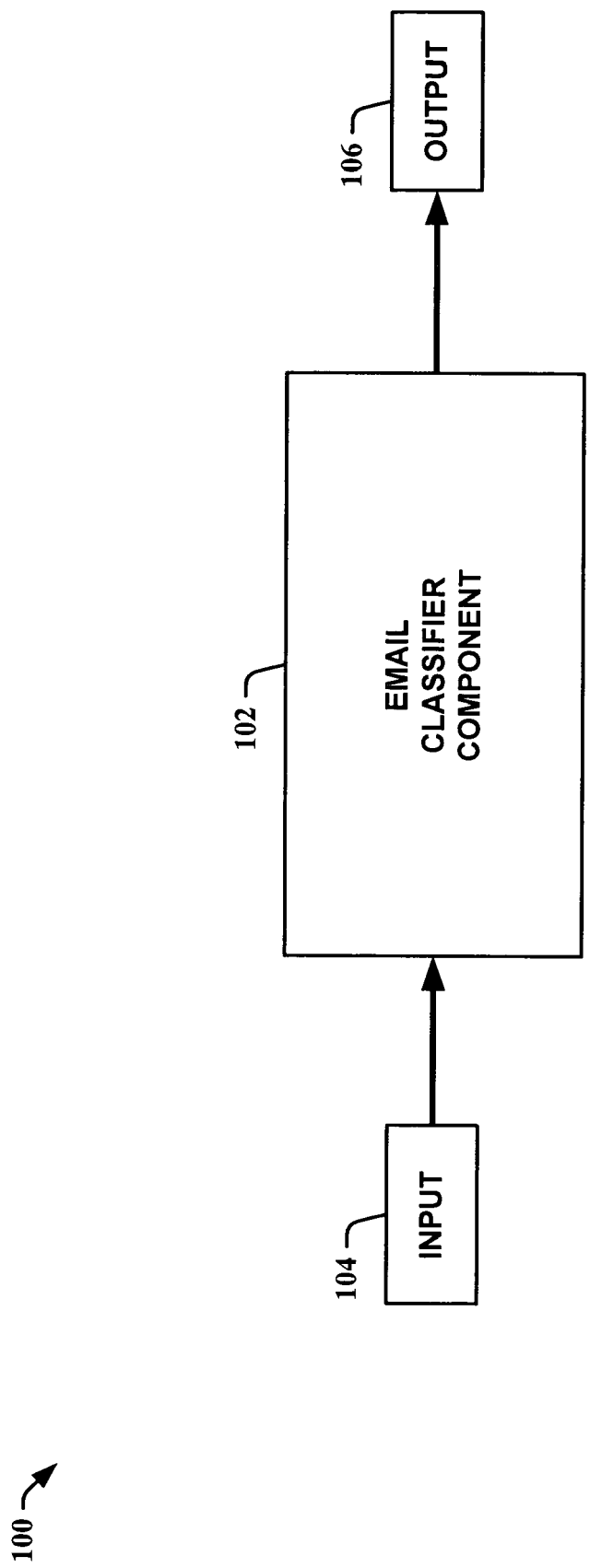
FIG. 1 is a block diagram of an email classification system in accordance with an aspect of an embodiment.

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter embodiments may be practiced without these specific details. In other instances, well-known structures and devices are shown in block diagram form in order to facilitate describing the embodiments.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The subject matter utilizes a class of models to detect whether or not an email is spam. In particular, a tree of classifiers is employed for email classification where the internal nodes of the tree correspond to features and each out-going edge from an internal node corresponds to a value for that feature. Within each leaf of the tree is a separate classifier. Thus, the decision tree facilitates in determining which classifier is utilized to determine if the email is likely to be spam. Overall classification accuracy is increased by dividing emails into a plurality of partitions and employing a classifier tailored for that specific partition. The partitioning is based on features of the emails such as, for example, length, font size, word choice, sender, and/or subject line and the like. For example, the length of an email message and the number of recipients can be utilized to dictate that different classifiers are employed to optimize the classification of each feature.

One skilled in the art can appreciate that the techniques described infra can also be augmented with preprocessing, for example, to remove commented and/or otherwise invisible text, etc. from HTML and other formatted emails to enhance spam detection. This facilitates to prevent spammers from hiding classification features inside the emails in order to sway detection results. User interfaces and/or automated techniques can also be incorporated to facilitate in personalizing and/or updating the infra techniques. This can be accomplished, for example, by collecting user data such as, for example, hand classified spam or desired emails as well as other data such as, for example, emails responded to and emails not responded to. This type of data can be utilized to facilitate the training of trees of classifiers. Personalization makes it much harder for spammers to defeat filtering techniques because every user has a different filter. The augmented techniques can also include white lists that contain, for example, email addresses that should not be categorized as spam regardless of classification. Automated data collection, features such as reverse IP lookups for address fraud, and/or challenges (requests of postage—computation and/or monetary) and the like are some additional techniques that can be utilized to augment the trees of classifiers to facilitate performance as well.

In FIG. 1, a block diagram of an email classification system 100 in accordance with an aspect of an embodiment is shown. The email classification system 100 is comprised of an email classifier component 102 that receives an input 104 and provides an output 106. The email classifier component 102 receives the input 104 which is comprised of at least one message such as, for example, an email message. It 102 then determines features of the input 104 and utilizes at least one message feature classifier employed via a decision tree to classify the input 104. The classified message is then provided as the output 106. The message features can include message length, message text font size, message sender, message sent time-of-day, and/or message text and the like. The decision tree utilized by the email classifier component 102 contains nodes that allow splits based upon each feature. Generally speaking, the splits are binary such as, for example, "is message length>50 words" has two answers—less than or equal to 50 words and greater than 50 words. Separate classifiers can then be utilized in the leaves of the decision tree for each feature. This allows greater tailoring of the email classifier component 102 and increased spam detection probabilities.

Figure 2:
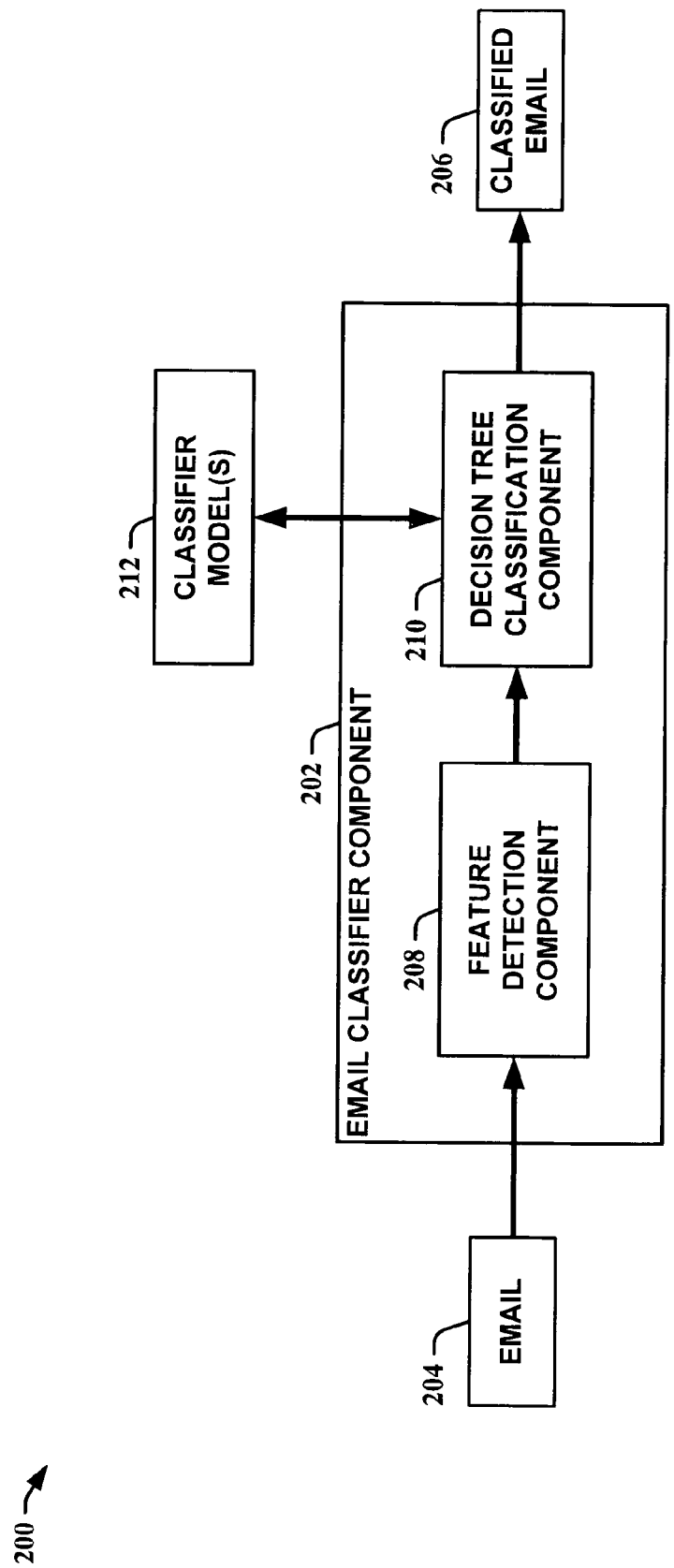
FIG. 2 is another block diagram of an email classification system in accordance with an aspect of an embodiment.

Looking at FIG. 2, another block diagram of an email classification system 200 in accordance with an aspect of an embodiment is depicted. The email classification system 200 is comprised of an email classifier component 202 that receives email 204 and provides classified email 206. The email classifier component 202 is comprised of a feature detection component 208 and a decision tree classification component 210 that interfaces with classifier model(s) 212. The feature detection component 208 receives the email 204 and detects at least one feature of the email 204. The decision tree classification component 210 utilizes the detected feature(s) received from the feature detection component 208 to facilitate in classifying the email 204. It 210 employs at least one classifier model(s) 212 via a decision tree that splits on the features of the email 204. The leaves of the decision tree are classifiers that are tailored to a specific email feature. The classifiers themselves can be different types such as, for example, linear classifiers and/or even other decision trees and the like. Linear classifiers utilized by the email classifier component 202 can include, but are not limited to, support vector machines (SVM) and/or logistic-regression classifiers and the like.

The decision tree classification component 210 employs the decision tree to determine an optimum classifier to utilize for evaluation of the email 204. Once the email 204 is classified, the decision tree classification component 210 provides the classified email 206 as an output. The classified email 206 can represent a spam classified email and/or other types of classified email such as "move," "delete," and/or "ignore" email and the like. In other words, the email 204 can be processed by one instance of the email classification system 200 to determine if the email 204 is spam. In another personalized instance of the email classification system 200, the email 204 can be determined to not be spam, but can be categorized as unimportant to a user. In this scenario, the email 204 may be classified as spam, move, delete, and/or ignore and the like by the user.

Figure 3:
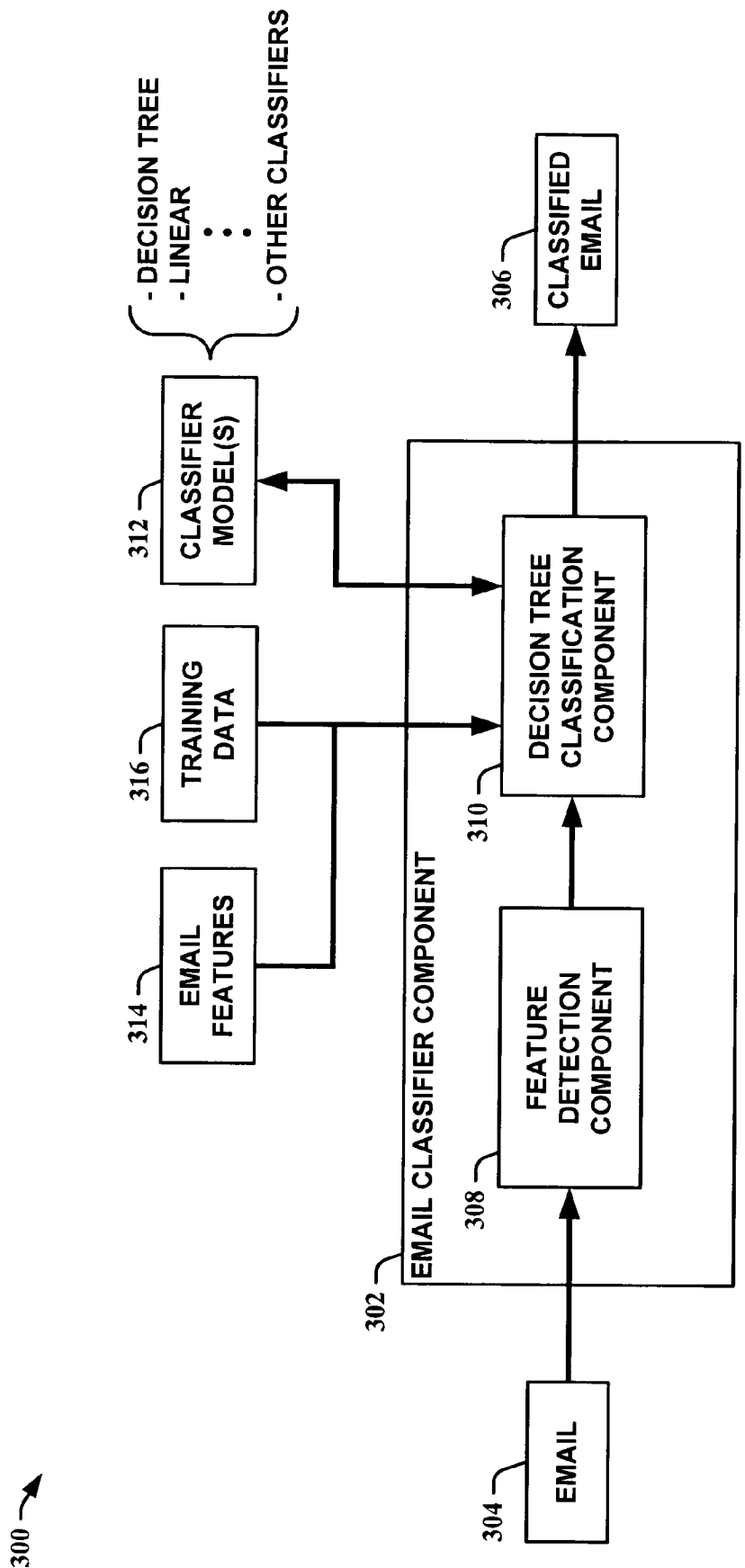
FIG. 3 is yet another block diagram of an email classification system in accordance with an aspect of an embodiment.

Turning to FIG. 3, yet another block diagram of an email classification system 300 in accordance with an aspect of an embodiment is illustrated. The email classification system 300 is comprised of an email classifier component 302 that receives email 304 and provides classified email 306. The email classifier component 302 is comprised of a feature detection component 308 and a decision tree classification component 310 that interfaces with classifier model(s) 312, email features 314, and/or training data 316. The feature detection component 308 receives the email 304 and detects at least one feature of the email 304. The decision tree classification component 310 utilizes the detected features received from the feature detection component 308 to facilitate in classifying the email 304. It 310 employs at least one classifier model(s) 312 via a decision tree that splits on the features of the email 304. The decision tree(s) are constructed utilizing email features 314 and training data 316. The internal nodes in the decision tree are tests on features of the email 304. However, not all features of the email 304 are necessarily represented in splits in the tree, and, typically, the vast majority of the features are not utilized. The leaf classifiers are generally functions of the other features of the email 304, and these "leaf specific" features facilitate in classifying the email 304. In a typical instance, the decision tree is constructed from scratch using the training data 316. In addition, classifiers can be constructed from other classifiers utilized in the nodes of the decision tree to facilitate in smoothing the classification results. Linear classifiers constructed from "compound features" of internal and/or external nodes of the decision tree can be employed as spam detectors as well.

Figure 4:
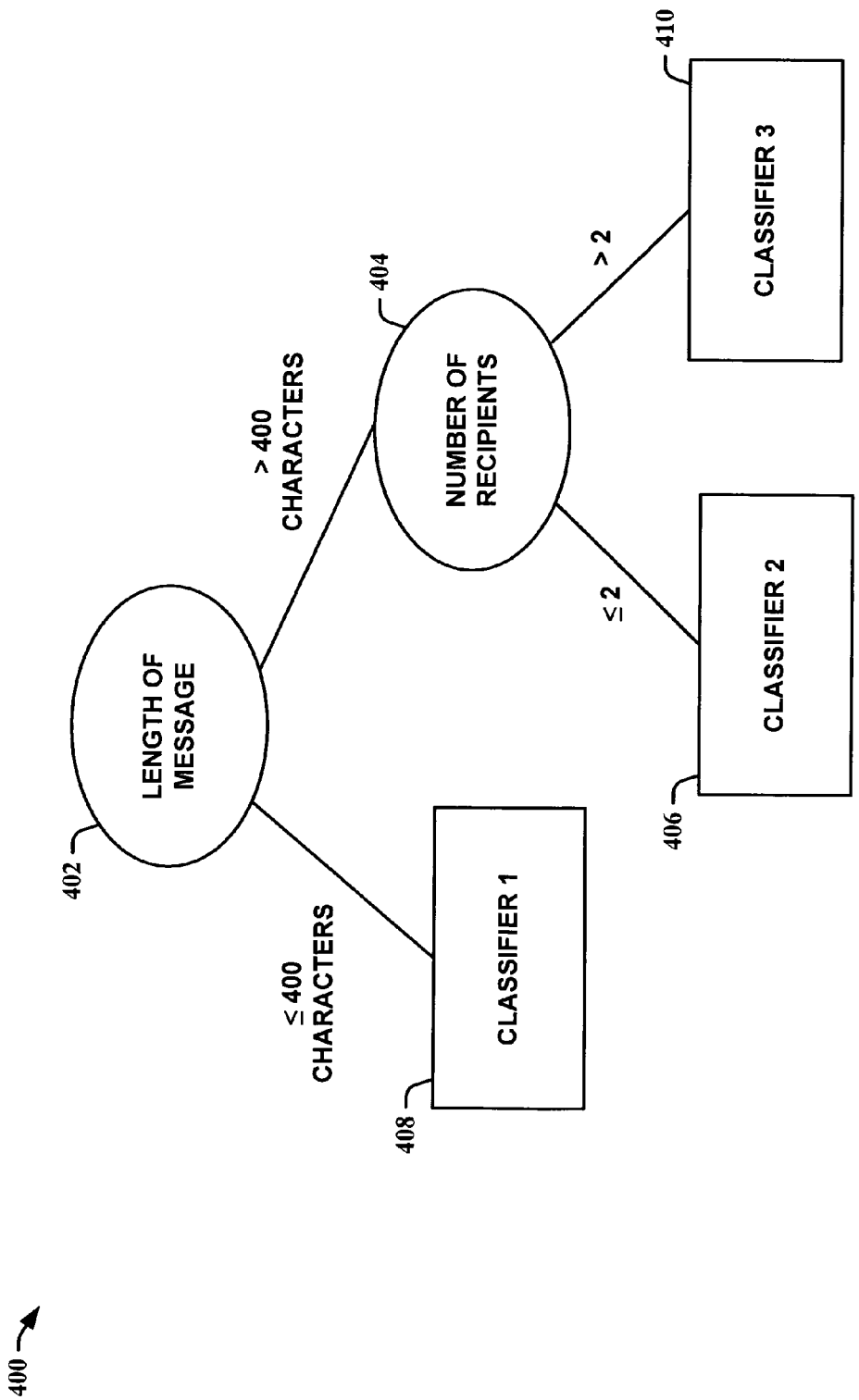
FIG. 4 is an illustration of an example decision tree splitting on email length and recipient number in accordance with an embodiment.

The leaves (i.e., classifiers) of the decision tree are be tailored to email containing specific features. The classifiers themselves can be different types such as, for example, linear classifiers and/or even other decision trees and the like. Linear classifiers utilized by the email classifier component 302 can include, but are not limited to, support vector machines (SVM) and/or logistic-regression classifiers and the like. The decision tree classification component 310 employs the decision tree to determine an optimum classifier to utilize for evaluation of the email 304. Once the email 304 is classified, the decision tree classification component 310 provides the classified email 306 as an output. The classified email 306 can represent a spam classified email and/or other types of classified email such as "move," "delete," and/or "ignore" email and the like. In other words, the email 304 can be processed by one instance of the email classifier component 302 to determine if the email 304 is spam. In another personalized instance of the email classification system 300, the email 304 can be determined to not be spam, but can be categorized as unimportant to a user. In this scenario, the email 304 may be classified as spam, move, delete, and/or ignore and the like by the user Thus, this technology provides a simple generalization of spam classification where a decision tree is utilized to facilitate in the determination of which classifier to use for a given feature. Separate classifiers are then employed based on a feature-by-feature basis, increasing the accuracy of the spam detection. For example, suppose that depending on the length of an email message and the number of recipients, the best classifier to use may be different. An example decision tree 400 with a root node 402, child node 404, and leaf nodes 406-410 for this situation is illustrated in FIG. 4.

To classify a particular email, the process starts at the root node 402 of the decision tree 400. Because the root node 402 is an internal node, the process looks at the corresponding feature of the email, namely its length. Suppose the email has 1000 characters, and therefore the process traverses to the right child node 404 of the root node 402. The process then looks at the number of recipients on the email, and assuming there is exactly one, the process traverses the left child and ends at the "Classifier 2" leaf node 406. The process then classifies the email using the classifier corresponding to this leaf node 406. The subject matter allows any type of classifier to be used in the leaf nodes 406-410, including a decision tree classifier. One instance utilizes a logistic-regression classifier in the leaves, which is of the same form as an SVM but is trained differently.

Data sparsity can become a problem with a decision tree of classifiers. For example, the bottom nodes might be trained on only one fourth as many examples as a normal classifier would be trained on, generally meaning that there is not enough data to do an accurate job. Some words might not appear at all in many messages in a leaf node. This can be alleviated by smoothing across nodes. For example, a linear classifier corresponding to an internal node of the tree can be trained based on all data relevant to that node and can be utilized as a "prior" for the nodes below it. The final classification of an email would be a function of all of the classifiers within the tree that are on the path from the root node to the leaf.

If a decision tree consists of linear classifiers, the entire tree can often be converted into a single linear model by creating "compound" features that incorporate the structure of the tree. For example, for the tree 400 above, the weight for the feature word "click" in Classifier 1 408 might be $C_1$. For Classifier 2 406 it would be $C_2$ and for Classifier 3 410, it would be $C_3$. The process can create the compound features: "≦400 characters AND click" with weight $C_1$. This is a feature that occurs only if the word click appears in a message with ≦400 characters. Similarly, the process can have "Number of recipients≦2 and >400 characters and word click" with weight $C_2$ which would be true if the word click occurred in a short message with at most 2 recipients. Similarly, the process can create a compound feature for "click" corresponding with weight $C_3$. If this is done for all words, then the resulting model is a linear model, with the same performance as the decision tree of linear classifiers.

This equivalency can be employed to build even more interesting models. For example, the process can build a decision tree in the way described supra. The process can then create compound features for all nodes, including internal nodes. A single model can then be learned for this set of compound features. This is a similar way of alleviating the data sparsity problem. The resulting model is a linear model at least as powerful as the decision tree model.

Decision Trees for Spam Filtering

Machine learning techniques can be utilized to construct a decision tree that partitions messages into sets and then learns a separate filter on the messages in each of these partitions. For example, HTML (hyper text markup language) messages can be partitioned from plain text ones and a separate model learned for each of them. Utilizing this process can increase spam detection by as much as 20% over current spam filters that utilize text features alone. Employing decision trees can also increase the accuracy of sets of messages when different properties can be found, specifically where things learned from messages of one set do not generalize well to messages of the other types. This can happen for messages of different languages, for messages of different sizes, and/or for messages with different encodings, etc. Decision trees also allow training with more email because a large set of email can be partitioned into many smaller sets, and MaxEnt training only needs to be applied on these partitions (and not on the whole data set).

Feature Description

Decision trees are a well known and much studied technique for classifying data (see, Breiman, Friedman, Olshen, and Stone; *Classification and Regression Trees* Wadsworth & Brooks; Monterey Calif.; 1984 and Quinlan; *C4. 5: programs for machine learning*; Morgan Kaufmann; San Francisco, Calif.; 1993). However, the subject matter herein employs a decision tree to partition email messages into sets that have similar feature properties and then train separate models using classifiers on each of these sets. By employing classifier models built using decision trees, for example, a 20% increase in spam email detection can be achieved over spam detection by a single monolithic model.

Figure 5:
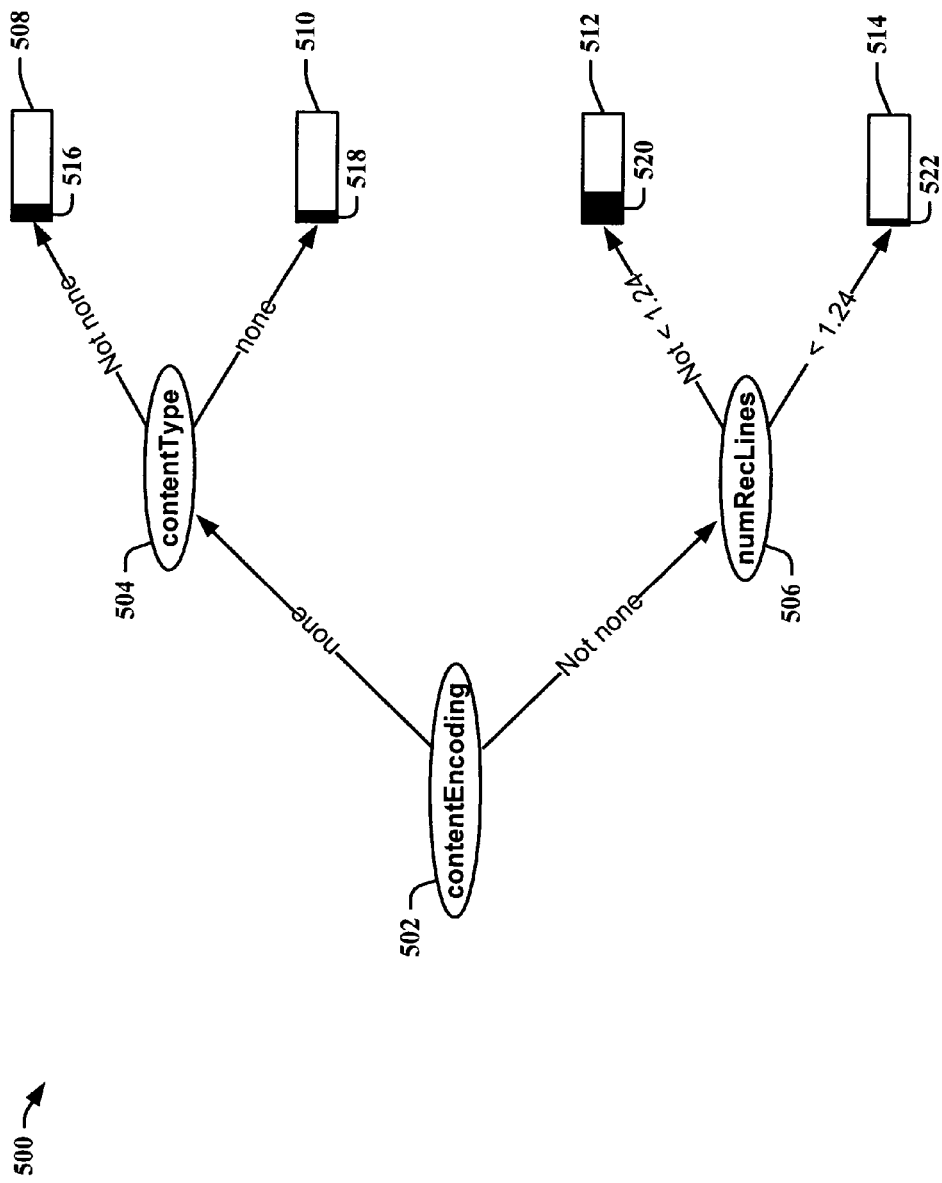
FIG. 5 is an illustration of a sample decision tree in accordance with an aspect of an embodiment.

In FIG. 5, an illustration of a sample decision tree 500 is shown. The root 502 and interior 504, 506 nodes contain tests on the attributes of email messages and leaf nodes 508-514 contain linear models (built with a MaxEnt (maximum entropy) algorithm) that estimate the probability a message is spam. The fraction of each leaf node that is shaded 516-522 indicates the fraction of corresponding messages that are spam. When a new message needs to be classified it starts at the root 502 of the decision tree, the attributes of the message are tested and links are followed in the tree until a specific model is reached at a leaf node. The model from the leaf is applied to the message, the resulting probability is compared with the spam confidence thresholds, and appropriate actions taken (e.g., delete the message, move it into a junk folder, etc.).

The power of the decision tree approach is that it allows separation of groups of messages that might otherwise confuse the classifier learning process. For example, if the text 'font' appears in an HTML message there is a good chance it is being used to make the display font very tiny—a common trick spammers use to try to confuse spam filters. The same text, 'font', in a plain text message cannot possibly change the display font, and thus is probably not a spammer trick. Separating plain text from HTML messages thus allows a more refined way to treat message content, and, thus, do a better job at filtering spam.

The distinction between HTML and plain text messages is intuitively clear, but there are many other potentially useful distinctions (see TABLE 1 infra for a list of example properties/features that can be utilized to partition email into sets). Other existing spam filters can employ data gathering techniques and machine learning algorithms to automatically determine how to partition messages to best filter spam. The algorithm takes as an input a set of email messages that have been labeled as spam or non-spam and a set of properties which should be considered as ways to partition the set of e-mail. The algorithm works roughly as follows. The utility of each partitioning property is estimated by (1) using it to partition the training data, (2) learning classifiers on the data in each of the resulting sets, and (3) recording how well the resulting models distinguish spam from good email. The partitioning property that resulted in the best spam classification is selected and added as a test to the decision tree, and then the learning algorithm is called recursively on the resulting data partitions. The recursion terminates when no further partitioning results in a better model than learning a single model on all the remaining data.

TABLE 1

Candidate properties for partitioning messages

| | |
|---|---|
| The content type of the message (plain text, HTML, etc.) | Are there any links or URLs in message Message contains an externally linked |
| The size of the message | image ("img" and "src" occur |
| The character set of the message | somewhere) |
| Message contains an image ("img" occurs somewhere in the body) | Subject starts with "Re:" Subject starts with "Fwd:" |
| Message contains an attachment | Message appears to be in English |
| The number of header lines | (contains at least 3 words from this |
| The number of received header lines | list "the a in on of to is are were from |
| The length of the message ID | where this that other which why |
| Does the from domain matches the domain in the first received line | when will") Message appears to be in other language |
| The length of the subject | (e.g., Spanish) |
| The content encoding type (base64, etc) | Message contains an attachment of type X |
| The subject character set | (e.g., executable, HTML, JPG, GIF, etc.) |
| | Number of recipients to the message (on email) |

Algorithm Description

TABLE 2 contains an example pseudo-code for the algorithm described supra. The algorithm starts with a tree that has a single leaf node. It recursively grows the tree by adding splits on message properties, partitioning the data according to the splits, and recurring on the partitions until some termination conditions are met.

TABLE 2

Pseudo-code for the decision tree building algorithm

Inputs:
Let T be a set of training messages
Let TreeTrain be a set that initially includes elements of T with 70% probability
Let Holdout initially be the set T - TreeTrain
Let P be a set of partition properties (for example, the ones listed in Table 1)
Let D be the current depth of the recursion, initially 1
Let M be a maximum recursion depth
Let DT be an initially empty decision tree
Outputs:
DT, a decision tree
BuildTree(DT, TrainTree, Holdout, P, D, M)
  If D ==M
    Let DT be a leaf, and return
  Build a model on TrainTree

TABLE 2-continued

Pseudo-code for the decision tree building algorithm

```
       Find the accuracy on Holdout at a 50% probability threshold
    For each p in P
       Partition Train Tree and Holdout using p
       Build a classifier for each of the TrainTree partitions
          Find the accuracy on the Holdout partition at 50% threshold
       Let the score for f be the weighted classification accuracy of
    partitions, where the weights are defined by the fraction of messages
    from TreeTrain that are in each partition.
       If the best partition score is not better than the TrainTree score
          Let DT be a leaf, and return
       Else
          Let DT be an internal node that splits on the best partition function
    p__max
          For each child of the split C
             Let TrainTree__C and Holdout__C be the associated partitions
             BuildTree(C, TrainTree__C, Holdout__C, P − {p__max}, D + 1, M)
```

Partitionings are evaluated based on their classification accuracy on holdout data. At the beginning of a learning run, each training message is randomly assigned to be part of the TreeTrain set with 70% probability; messages not in TreeTrain are placed into a Holdout set. Each potential partitioning is scored by (1) using it to split the data (both TreeTrain and Holdout), (2) learning a classifier on the training data in each partition, and (3) computing the classification accuracy of model on the partition's holdout data (at the 50% probability threshold). The final score for partitioning the data by one of the properties is the weighted average of the scores of the models built on the data partitions; the weight for each model is simply the fraction of messages used to train that model. The partition function with the highest score is compared to a single classifier model built on all of the training data and evaluated on all of the holdout data. If the single model is better, the recursion along that path is terminated. If one of the partition functions is better, a split based on that partition function is added to the tree, the data is partitioned, and the learning algorithm is called recursively on each partition.

For example, consider the property 'Message contains an attachment'. To evaluate a split based on this property, all the training messages (from the Train Tree set) that do contain an attachment are put into a set, call it contain_yes, and all the training messages that do not contain an attachment are put into a set, call it contain_no. For the sake of the example, suppose 40% of the data is in contain_yes and 60% of the data is in contain_no. A classifier is then built on the data in each of these sets and one is also built on all of the data in TreeTrain. The holdout data is then split into sets in a similar manner; call these sets h_contain_Yes and h_contain_no. The three models are evaluated by determining their classification accuracy on their respective holdout sets. Suppose that the model built on contain_yes achieves 80% accuracy on the data in h_contain_yes, the model built on contain_no achieves 100% accuracy on the data in h_contain_no, and the model built on TrainTree achieves 90% accuracy on the data in Holdout. The score for the 'Message contains an attachment' partitioning property is the weighted average of the model built on contain_yes and the one build on contain_no, and is 0.92 (that is: 0.4* 0.8 +0.6*1.0). The score for the partition is better than the score for the single monolithic model and so a split is put in the tree and the algorithm is called recursively on the data in contain_yes and contain_no. The algorithm evaluates partitions based on all of the properties and selects the best (while this example only evaluated a partition on a single property).

This algorithm has two types of features for each message: the partition properties and the Text/IP/hostname features that are used by the classifier. Partition properties are used as tests in internal nodes of the decision tree, and the Text/IP/hostname features are used in the classifier models at the leaves. The Text/IP/hostname features can be utilized as tests in the decision tree, but doing so introduces additional complexities.

Some of the message properties utilized for partitioning take numeric values (e.g., message size is expressed in bytes). For such attributes the learning algorithm considers partitioning data based on a series of thresholds and selects the threshold that works best. Thresholds are chosen empirically based on the distribution of the properties values in the training data. For example, for the size attribute, the algorithm can consider: splitting messages<1000 bytes from those≧1000 bytes; splitting messages<4000 bytes from those ≧4000 bytes; etc.

Some of the message properties utilized for partitioning have more than two values (e.g., the character set of the message). For such properties the learning algorithm considers a binary split for each possible value. For example, it considers: splitting all messages in US-ASCII from all other messages; splitting all messages in ANSI/OEM Japanese from all other messages; etc.

Decision Tree Based Examples

In one example experiment, training data was utilized from the 300,000 messages before a certain date and the testing data consisted of 40,000 messages from a period occurring two weeks later. Tree training was carried out using 50,000 features to score the MaxEnt models at the leaves. Once the structure of the decision tree was fixed, 500,000 features were evenly divided among the leaves of the decision tree and learned models that utilized MaxEnt code. For example, if the learned decision tree had 10 leaves, a MaxEnt model with 50,000 features is learned for each of them.

TABLE 2 shows the attributes that were considered for splitting on in the experiments. Notice that this is a subset of the attributes listed in TABLE 1. All of the attributes shown in TABLE 2 were used for learning a depth 5 tree, except for the length of the messageID. The features listed in TABLE 2 are roughly in order of value that they added to the decision tree.

TABLE 2

Attributes considered for split in the experiments

Figure 6:
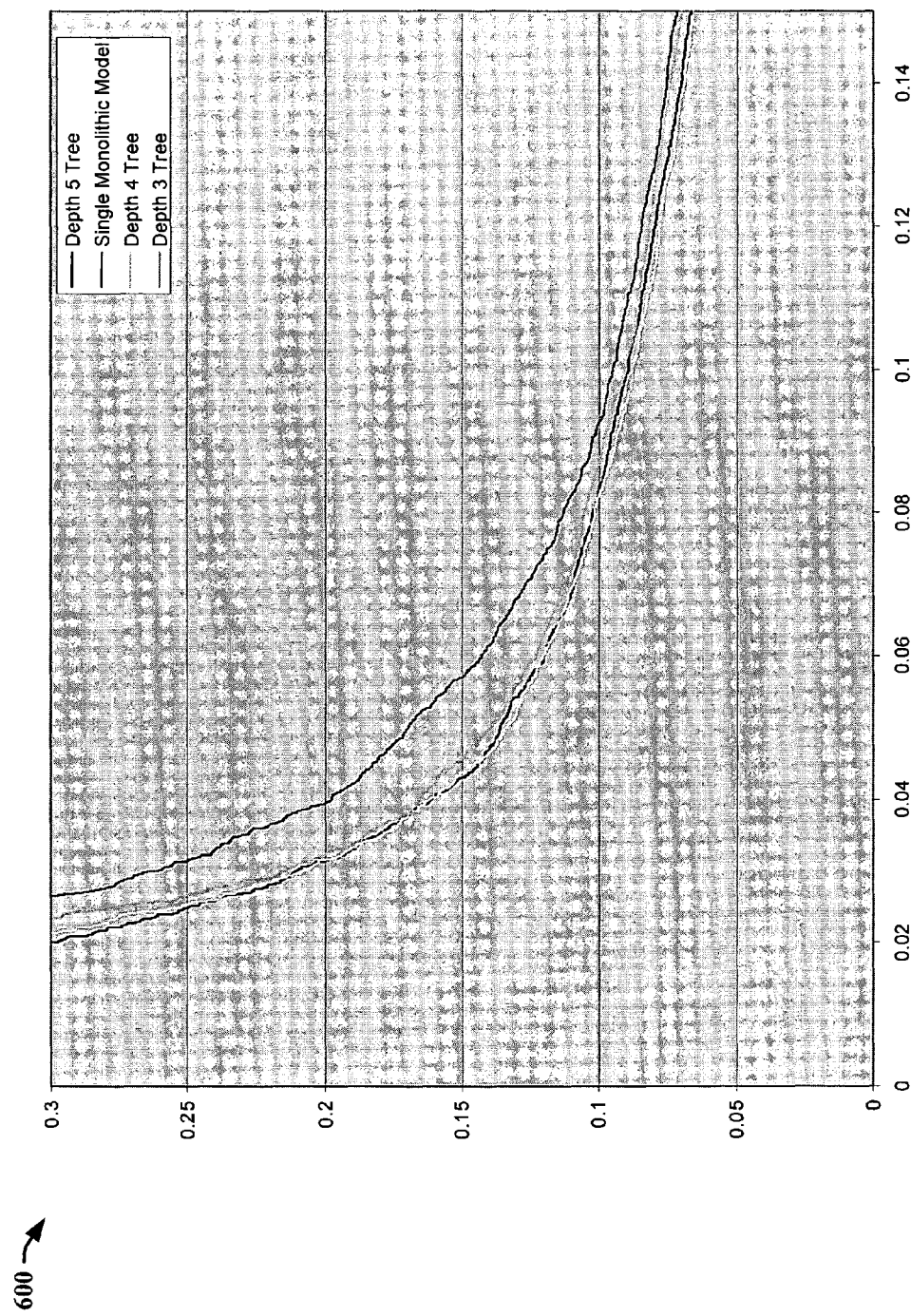
FIG. 6 is an illustration of a graph that depicts test results utilizing a decision tree learning algorithm to improve the performance on text data in accordance with an aspect of an embodiment.
Figure 7:
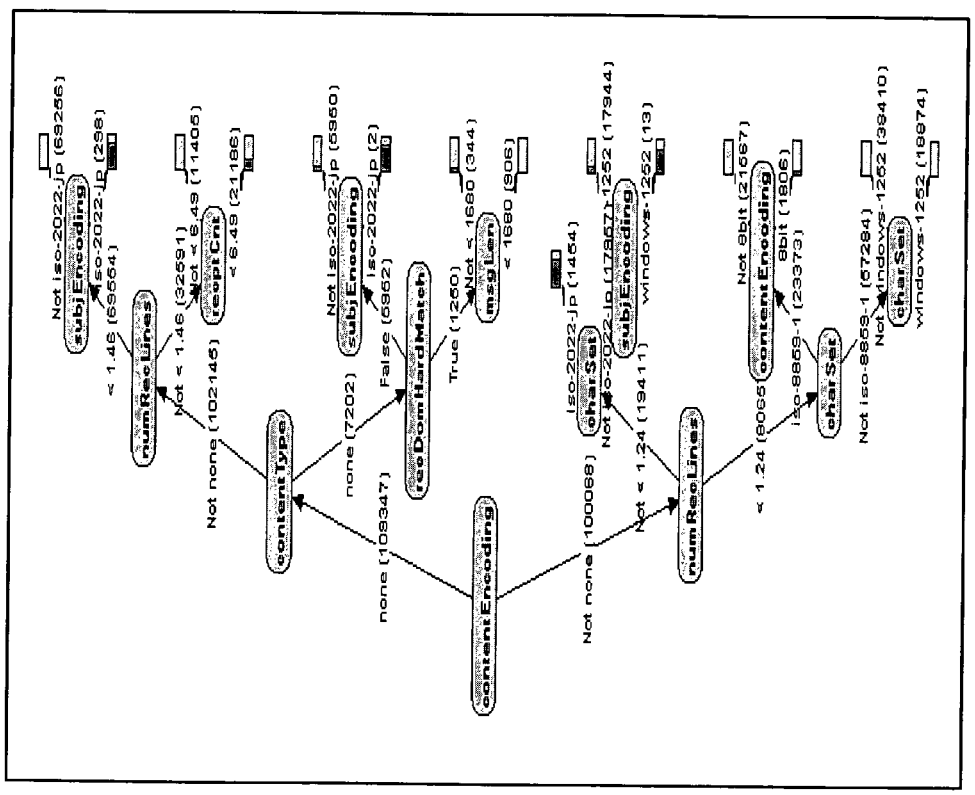
FIG. 7 is an illustration of depth 5 decision tree learned splits in accordance with an aspect of an embodiment.

The content encoding type (base64, etc)
The number of received header lines
The character set of the message
The content type of the message (plain text, HTML, etc.)
The subject character set
Does the from domain matches the domain in the first received line
The size of the message
Number of recipients to the message
The length of the message ID FIG. 6 illustrates a graph 600 that depicts the results of using the decision tree learning algorithm to improve the performance on text data. The decision tree based models all performed substantially better than the monolithic model, yielding gains of as much as 20% near the email delete threshold and 5% near the email move threshold. FIG. 7 shows the splits learned for the depth 5 decision tree. The decision trees learned at other depths were subtrees of this tree. (For example, FIG. 5 shows the depth 3 tree, which exactly matches the top several levels of the depth 5 tree.)

TABLE 3 shows summary information about the decision trees learned with different depth limits. For example, depth 4 appeared to give the best results for this scenario.

TABLE 3

Summary of trees by depth limit

| Tree Depth | FN Improvement Email Delete | FN Improvement Email Move | Time to Learn Tree (hh:mm) |
|---|---|---|---|
| 2 | — | — | 4:10 |
| 3 | 17.6% | 4.5% | 7:11 |
| 4 | 21.2% | 7.7% | 10:06 |
| 5 | 19.9% | 5.8% | 12:25 |

Alternative Implementations

There is an alternative implementation strategy that results in a single model (instead of a decision tree with one model at each leaf). This can be easier to display to clients and, in some situations, it can have better results than the implementation described supra. Models can be built utilizing data from very different time periods and a determination made as to how much the structure of the learned decision tree changes over time. If it changes a substantial amount, it is indicative of the necessity to build new decision trees regularly. If it does not, then less frequent updates to the decision tree can be adequate to maintain performance. Models can also be built utilizing up-to-date IP features. An application can be written to extract all the features from, for example, TABLE 1 to determine if they facilitate the process. However, if they do not help, the learning algorithm automatically determines this and does not use them.

Splits can be evaluated based on their classification accuracy at thresholds of concern. Models can be learned using different sigma squared values. It is possible that a value determined to be best for text data (e.g., 0.001) can be magnitudes off of a best value for decision trees (e.g., 1.0). A set of holdout users can be constructed instead of a set of holdout data. Two messages to the same person can have important hints inside the messages (e.g., the person's name) which a learner can key off of, and build a model that does not generalize well across users.

Words and/or phrases can be utilized to partition data. For example, a model can be learned for all messages with the phrase 'order confirmation' in it, and one model for all other messages. Partitioning can be based on the presence of any token output by a cracking process, or a list of candidate words and phrases, or both can be handcrafted.

Utilizing Linear Models with Trees

Different types of linear classifiers can be utilized in a decision tree for detecting email spam. In general, weighted sums of email features are determined and compared to a threshold value, forming a linear model. For example, lists of "spam-like" and "non-spam-like" words can be created. A good example of a spam-like word is "wet" and a good example of a non-spam-like word is "weather." Weights—numbers—to be associated with each of these words are then learned. The more spam-like a word is, the larger the weight. In addition to word-based features, other features can be utilized as well, such as the time of day when the message was sent (spam is typically more likely to be sent at night). Weights are associated with these other features as well. Generally, any message information can have an associated weight.

When a new email is partitioned via a decision tree to a linear classifier leaf, the list of features in that message is determined (i.e., what words are present, etc.) and then all the weights associated with those features are summed. If the total weight is more than a threshold value, the email is labeled as spam. If it is less than that value, the email is labeled as good. The total weight can also be converted into a probability and then compared to a threshold. The probability is derived from the total weight, and so is representative of utilizing the weights directly.

Feature sets can be relatively simple. Specific words in an email tend to be among the most important features. Typically, features also tend to be binary—that is, either the feature is present, or it is not. For example, a feature can be whether the word "wet" occurs in an email and whether the word "weather" occurs in an email. Phrases can also be utilized as features. For example, "SEE YOU," "NEXT WEEK," and "SCHEDULED FOR" phrases tend to indicate that an email is not spam, while the phrases like "MAKE MONEY" and "DEAR FRIEND" tend to indicate that an email is spam. Features can also include distinguishing between whether a word occurs in the subject or the body of an email. For example, if the word "QUESTION" occurs in the subject of an email, it tends to indicate not-spam, while if it occurs in the body, it tends to indicate spam. Additional types of features can be utilized as well. These include, for example, whether the email has attachments, how large the email is, whether there are non-alphanumeric words in the email body or in the subject, how many recipients of the email there are, the time the email was sent, whether there are all uppercase words in the email body or subject, the percentage of uppercase words in the body, and/or the percentage of non-alphanumeric characters in the body and the like.

In general, it is not practicable to utilize, for example, every word that occurs in every email as a feature—there are simply too many. However, there are a number of techniques for determining which words to use. One technique is called "mutual information" which measures how much information a word gives about whether or not an email is spam. A word that occurs only in spam or only in good messages has high mutual information; a word that occurs equally often in spam and non-spam has zero mutual information. Frequently, mutual information favors rare words (a word that only occurs a few times but always in good mail or spam has high mutual information).

The values or weights assigned to these features can also be determined by applying specific algorithms such as with support vector machine (SVM) techniques. The basic idea of SVM techniques is to find a set of weights such that all the spam email is above a threshold and all the good email is below that threshold. SVM techniques have the property that spam emails are as far above the threshold as possible and the non-spam is as far below as possible. A perfect separator between spam and good emails can be difficult to determine due to such factors as, for example, mislabeled training data and/or the problem is inherently very hard (e.g., a friend forwards spam email to a user which can be associated as non-spam, but the contents looks substantially like spam).

The SVM techniques determine the best weights and determine a maximal separation of good and spam emails. SVM algorithms that are robust to misclassifications can also be employed even when there is not a perfect separation of email types. In that case, the SVM algorithm finds a line that does as good a job as possible. However, users typically do not want to miss any of their wanted email, so the threshold that the SVM finds is generally too aggressive for most users. For emails that are right on the threshold, there is about a 50% chance that an email has been misclassified. Fortunately, the further the emails are from the threshold, the less likely it is that the email is misclassified. Thus, a separation line can be selected with the same slope (same weights) but a different, more conservative threshold. Some spam may reach a user, but the probability of filtering out legitimate emails is substantially reduced.

The distance from the optimal split is a useful way to estimate the probability that an email is spam. When a message is substantially near this threshold, it is difficult to determine if the email spam or not—the probability is 50/50. As the emails get further and further from this line, the probability increases. The distance from this line is the sum of the weights, minus the threshold value—when the distance is zero (right on the threshold), the probability is 50/50. An example function for mapping this distance is:

$$\exp(a \times distance + b)/(1 + \exp(a \times distance + b)) \quad \text{(Eq. 1)}$$

where exp is the exponentiation function, and a and b are constants. The constants can be determined, for example, by utilizing an algorithm that considers how many points in the training data are on the wrong side of the line and how far various points are from the line. The threshold can be set in terms of the probability, rather than in terms of any particular distance. For example, a probability threshold of 96.5% can classify approximately 60% of the email as spam, and misses almost none of the wanted mail. User interfaces can be utilized to allow users to control how aggressive the filter is. Thus, the user can adjust the probability threshold, with a default setting of 96.5% being good. But, users who want to be more aggressive or more conservative can adjust it in either direction.

Figure 8:
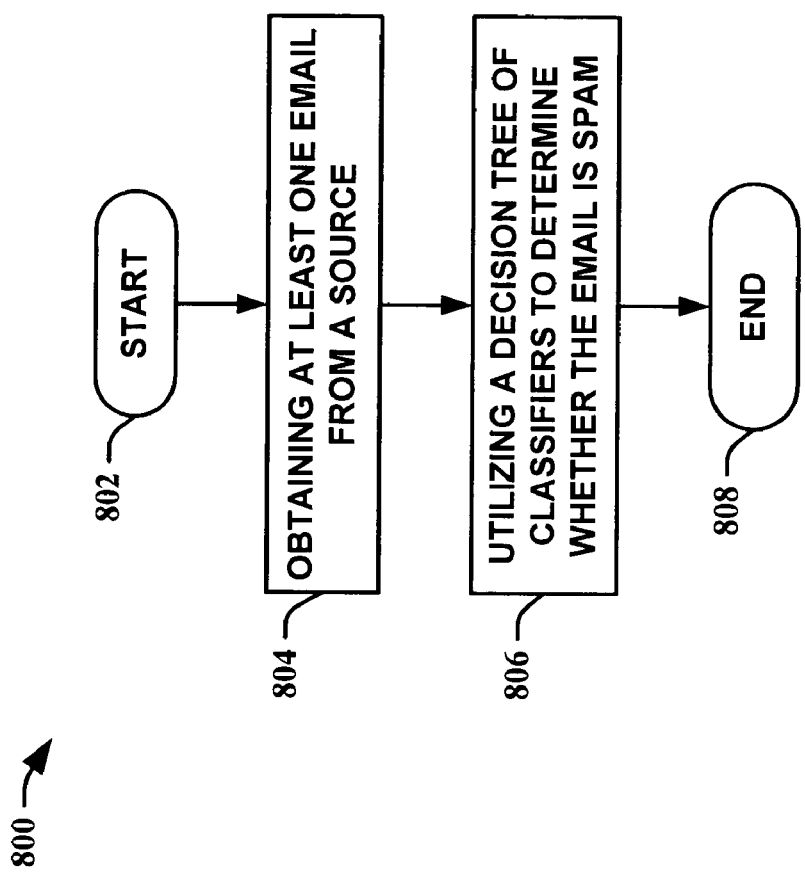
FIG. 8 is a flow diagram of a method of facilitating email classification in accordance with an aspect of an embodiment.
Figure 9:
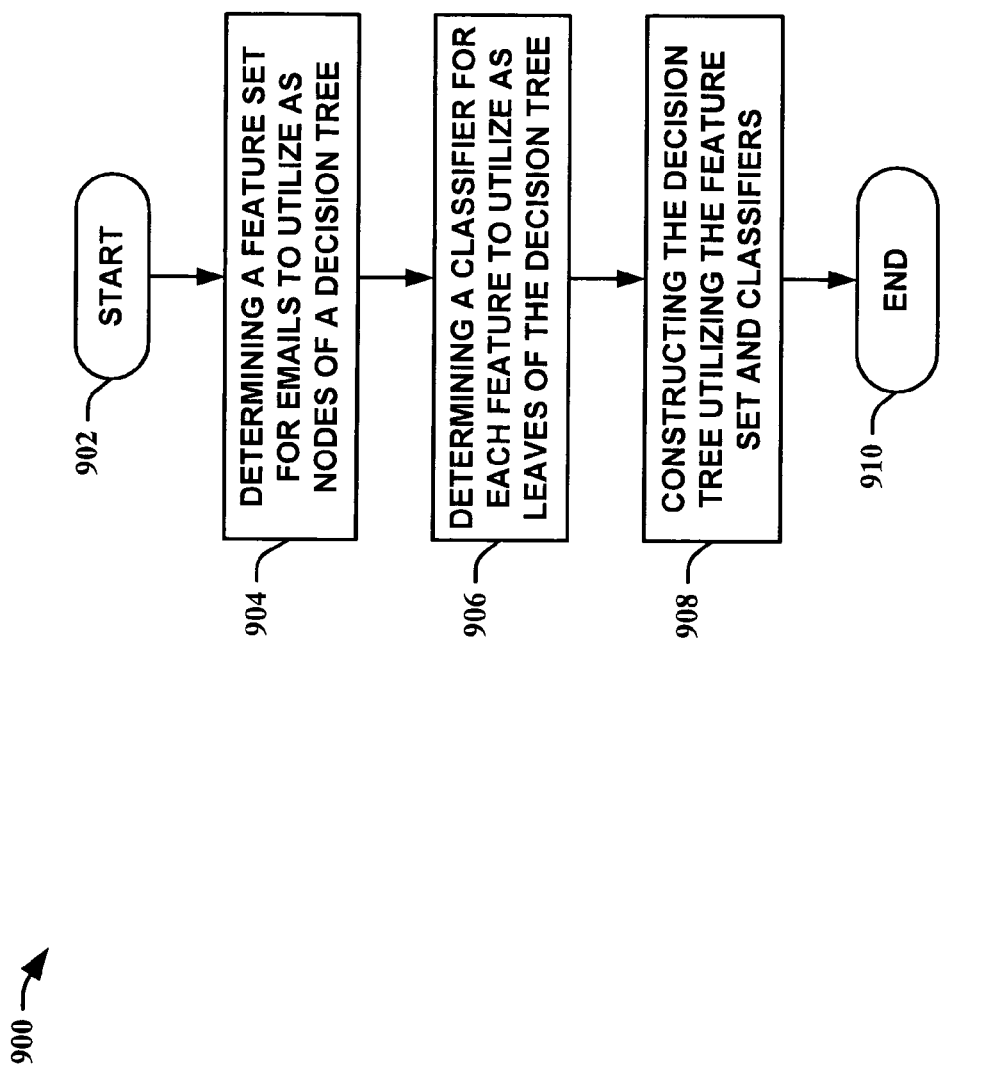
FIG. 9 is a flow diagram of a method of constructing an email decision tree that facilitates email classification in accordance with an aspect of an embodiment.
Figure 10:
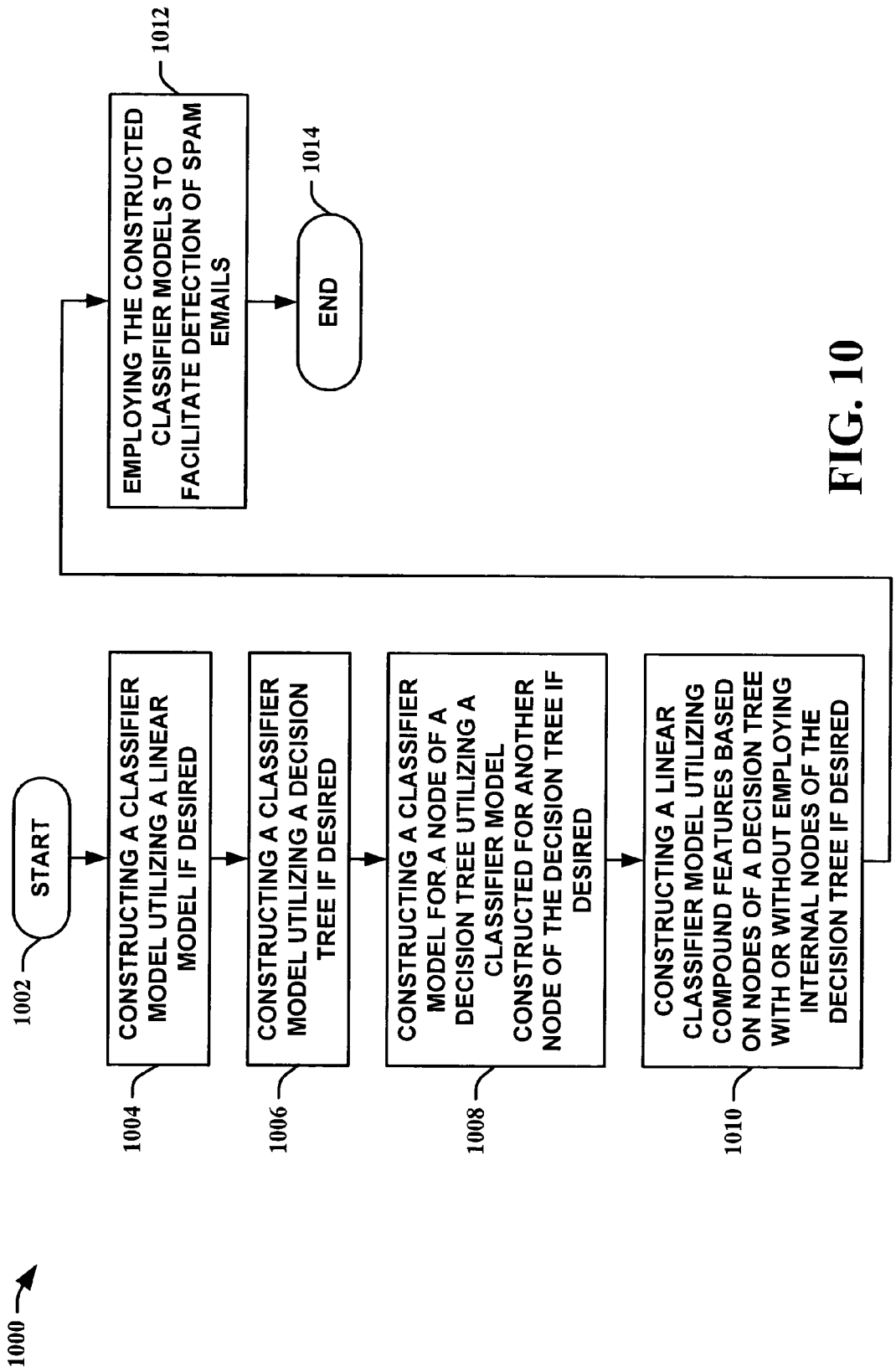
FIG. 10 is a flow diagram of a method of constructing classifiers for utilization in email classification in accordance with an aspect of an embodiment.

In view of the exemplary systems shown and described above, methodologies that may be implemented in accordance with the embodiments will be better appreciated with reference to the flow charts of FIGS. 8-10. While, for purposes of simplicity of explanation, the methodologies are shown and described as a series of blocks, it is to be understood and appreciated that the embodiments are not limited by the order of the blocks, as some blocks may, in accordance with an embodiment, occur in different orders and/or concurrently with other blocks from that shown and described herein. Moreover, not all illustrated blocks may be required to implement the methodologies in accordance with the embodiments.

The embodiments may be described in the general context of computer-executable instructions, such as program modules, executed by one or more components. Generally, program modules include routines, programs, objects, data structures, etc., that perform particular tasks or implement particular abstract data types. Typically, the functionality of the program modules may be combined or distributed as desired in various instances of the embodiments.

In FIG. 8, a flow diagram of a method 800 of facilitating email classification in accordance with an aspect of an embodiment is shown. The method 800 starts 802 by obtaining at least one email from a source 804. The source can include, but is not limited to, an online email account and/or an email storage device and the like. "Email" can include text messages, HTML messages, and/or graphical messages and the like. A decision tree of classifiers is then utilized to determine whether the email is spam 806, ending the flow 808. The decision tree utilizes detected features of the obtained email to facilitate in classifying the email. The tree facilitates optimum selection of a classifier for the email via utilization of nodes based on email features that allow splits to tree leaves containing separate classifiers. The leaves (classifiers) can be tailored to a specific email feature. The classifiers themselves can be different types such as, for example, linear classifiers and/or even other decision trees and the like. Linear classifiers can include, but are not limited to, support vector machines (SVM) and/or logistic-regression classifiers and the like.

Turning to FIG. 9, a flow diagram of a method 900 of constructing an email decision tree that facilitates email classification in accordance with an aspect of an embodiment is depicted. The method 900 starts 902 by determining a feature set for emails to utilize as nodes of a decision tree 904. Features of the emails can include, but are not limited to, message length, text font size, word choice, sender, time-of-day received, and/or subject line and the like. A classifier for each feature is then determined to utilize as leaves of the decision tree 906. The classifiers themselves can be different types such as, for example, linear classifiers and/or even other decision trees and the like. Linear classifiers can include, but are not limited to, support vector machines (SVM) and/or logistic-regression classifiers and the like. The decision tree is then constructed utilizing the feature set and classifiers 908, ending the flow 910. One skilled in the art will appreciate that training data can also be utilized in the construction of the decision tree to facilitate in optimizing its performance.

Looking at FIG. 10, a flow diagram of a method 1000 of constructing classifiers for utilization in email classification in accordance with an aspect of an embodiment is illustrated. The method 1000 starts 1002 by constructing a classifier model utilizing a linear model if desired 1004. The linear models can include, but are not limited to, support vector machines (SVM) and/or logistic-regression classifiers and the like. A classifier model is then constructed utilizing a decision tree if desired 1006. Decision trees themselves can be utilized as leaves (classifiers) of other decision trees. A classifier model for a node of a decision tree is then constructed utilizing a classifier model constructed for another node of the decision tree if desired 1008. To facilitate smoothing of email classification (especially in sparse data environments), classifier models can be utilized to build leaves for additional nodes of the decision tree. A linear classifier model is then constructed utilizing compound features based on nodes of a decision tree with or without employing internal nodes of the decision tree if desired 1010. The linear model can achieve substantially the same or better performance than the decision tree. The constructed classifier models are then employed to facilitate detection of spam emails 1012, ending the flow 1014. The various classifier models constructed above allow a spam detection filter to have flexibility, not only in providing specific classifiers for specific email features, but also to compensate for data sparsity and computation limitations and the like while providing increased detection performance.

Figure 11:
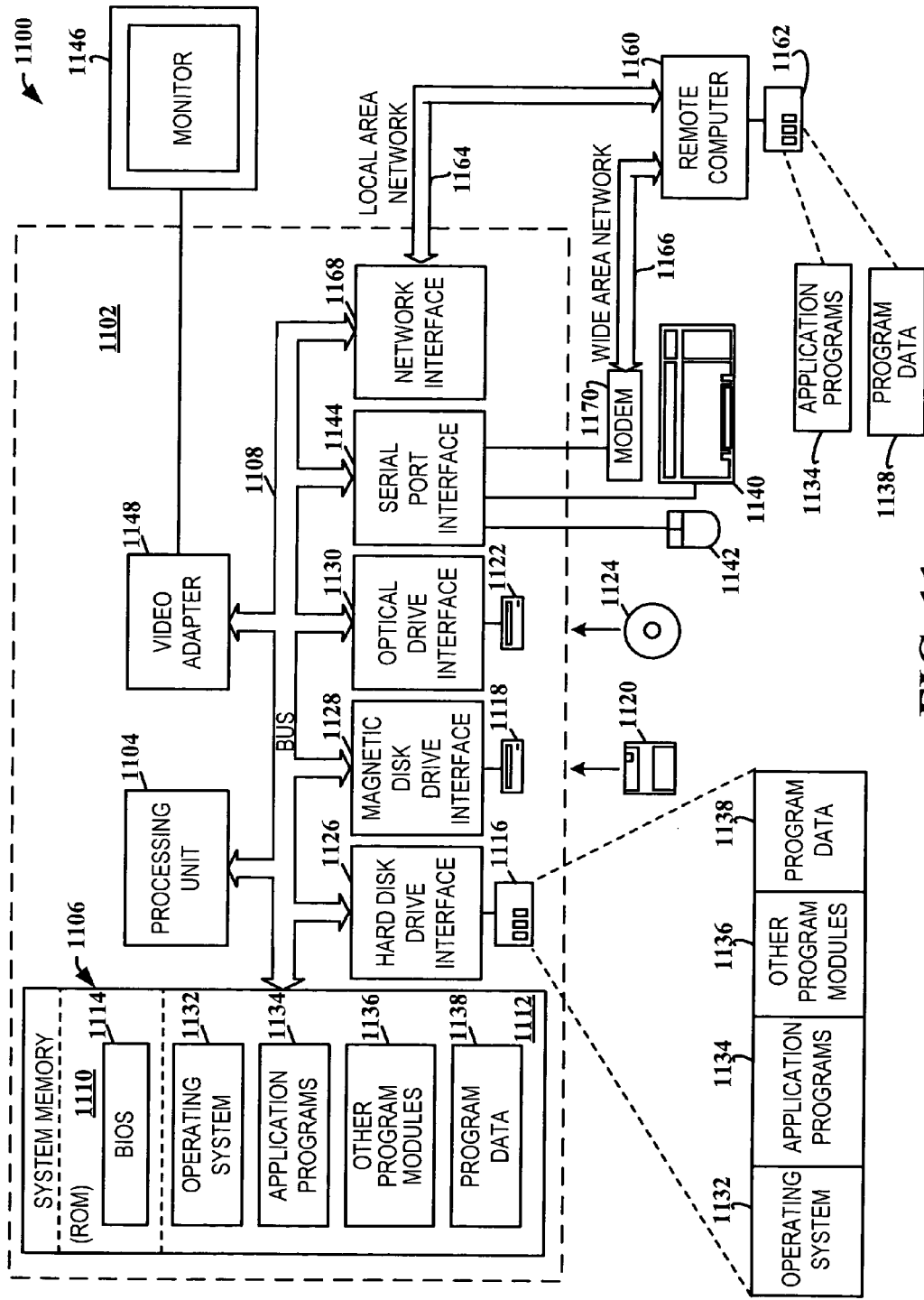
FIG. 11 illustrates an example operating environment in which an embodiment can function.

In order to provide additional context for implementing various aspects of the embodiments, FIG. 11 and the following discussion is intended to provide a brief, general description of a suitable computing environment 1100 in which the various aspects of the embodiments may be implemented. While the embodiments have been described above in the general context of computer-executable instructions of a computer program that runs on a local computer and/or remote computer, those skilled in the art will recognize that the embodiments may also be implemented in combination with other program modules. Generally, program modules include routines, programs, components, data structures, etc., that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, handheld computing devices, microprocessor-based and/or programmable consumer electronics, and the like, each of which may operatively communicate with one or more associated devices. The illustrated aspects of the embodiments may also be practiced in distributed computing environments where certain tasks are performed by remote processing devices that are linked through a communications network. However, some, if not all, aspects of the embodiments may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 11, an exemplary system environment 1100 for implementing the various aspects of the embodiments include a conventional computer 1102, including a processing unit 1104, a system memory 1106, and a system bus 1108 that couples various system components, including the system memory, to the processing unit 1104. The processing unit 1104 may be any commercially available or proprietary processor. In addition, the processing unit may be implemented as multi-processor formed of more than one processor, such as may be connected in parallel.

The system bus 1108 may be any of several types of bus structure including a memory bus or memory controller, a peripheral bus, and a local bus using any of a variety of conventional bus architectures such as PCI, VESA, Microchannel, ISA, and EISA, to name a few. The system memory 1106 includes read only memory (ROM) 1110 and random access memory (RAM) 1112. A basic input/output system (BIOS) 1114, containing the basic routines that help to transfer information between elements within the computer 1102, such as during start-up, is stored in ROM 1110.

The computer 1102 also may include, for example, a hard disk drive 1116, a magnetic disk drive 1118, e.g., to read from or write to a removable disk 1120, and an optical disk drive 1122, e.g., for reading from or writing to a CD-ROM disk 1124 or other optical media. The hard disk drive 1116, magnetic disk drive 1118, and optical disk drive 1122 are connected to the system bus 1108 by a hard disk drive interface 1126, a magnetic disk drive interface 1128, and an optical drive interface 1130, respectively. The drives 1116-1122 and their associated computer-readable media provide nonvolatile storage of data, data structures, computer-executable instructions, etc. for the computer 1102. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1100, and further that any such media may contain computer-executable instructions for performing the methods of the embodiments.

A number of program modules may be stored in the drives 1116-1122 and RAM 1112, including an operating system 1132, one or more application programs 1134, other program modules 1136, and program data 1138. The operating system 1132 may be any suitable operating system or combination of operating systems. By way of example, the application programs 1134 and program modules 1136 can include an email classification scheme in accordance with an aspect of an embodiment.

A user can enter commands and information into the computer 1102 through one or more user input devices, such as a keyboard 1140 and a pointing device (e.g., a mouse 1142). Other input devices (not shown) may include a microphone, a joystick, a game pad, a satellite dish, a wireless remote, a scanner, or the like. These and other input devices are often connected to the processing unit 1104 through a serial port interface 1144 that is coupled to the system bus 1108, but may be connected by other interfaces, such as a parallel port, a game port or a universal serial bus (USB). A monitor 1146 or other type of display device is also connected to the system bus 1108 via an interface, such as a video adapter 1148. In addition to the monitor 1146, the computer 1102 may include other peripheral output devices (not shown), such as speakers, printers, etc.

It is to be appreciated that the computer 1102 can operate in a networked environment using logical connections to one or more remote computers 1160. The remote computer 1160 may be a workstation, a server computer, a router, a peer device or other common network node, and typically includes many or all of the elements described relative to the computer 1102, although for purposes of brevity, only a memory storage device 1162 is illustrated in FIG. 11. The logical connections depicted in FIG. 11 can include a local area network (LAN) 1164 and a wide area network (WAN) 1166. Such networking environments are commonplace in offices, enterprise-wide computer networks, intranets and the Internet.

When used in a LAN networking environment, for example, the computer 1102 is connected to the local network 1164 through a network interface or adapter 1168. When used in a WAN networking environment, the computer 1102 typically includes a modem (e.g., telephone, DSL, cable, etc.) 1170, or is connected to a communications server on the LAN, or has other means for establishing communications over the WAN 1166, such as the Internet. The modem 1170, which can be internal or external relative to the computer 1102, is connected to the system bus 1108 via the serial port interface 1144. In a networked environment, program modules (including application programs 1134) and/or program data 1138 can be stored in the remote memory storage device 1162. It will be appreciated that the network connections shown are exemplary and other means (e.g., wired or wireless) of establishing a communications link between the computers 1102 and 1160 can be used when carrying out an aspect of an embodiment.

In accordance with the practices of persons skilled in the art of computer programming, the embodiments have been described with reference to acts and symbolic representations of operations that are performed by a computer, such as the computer 1102 or remote computer 1160, unless otherwise indicated. Such acts and operations are sometimes referred to as being computer-executed. It will be appreciated that the acts and symbolically represented operations include the manipulation by the processing unit 1104 of electrical signals representing data bits which causes a resulting transformation or reduction of the electrical signal representation, and the maintenance of data bits at memory locations in the memory system (including the system memory 1106, hard drive 1116, floppy disks 1120, CD-ROM 1124, and remote memory 1162) to thereby reconfigure or otherwise alter the computer system's operation, as well as other processing of signals. The memory locations where such data bits are maintained are physical locations that have particular electrical, magnetic, or optical properties corresponding to the data bits.

Figure 12:
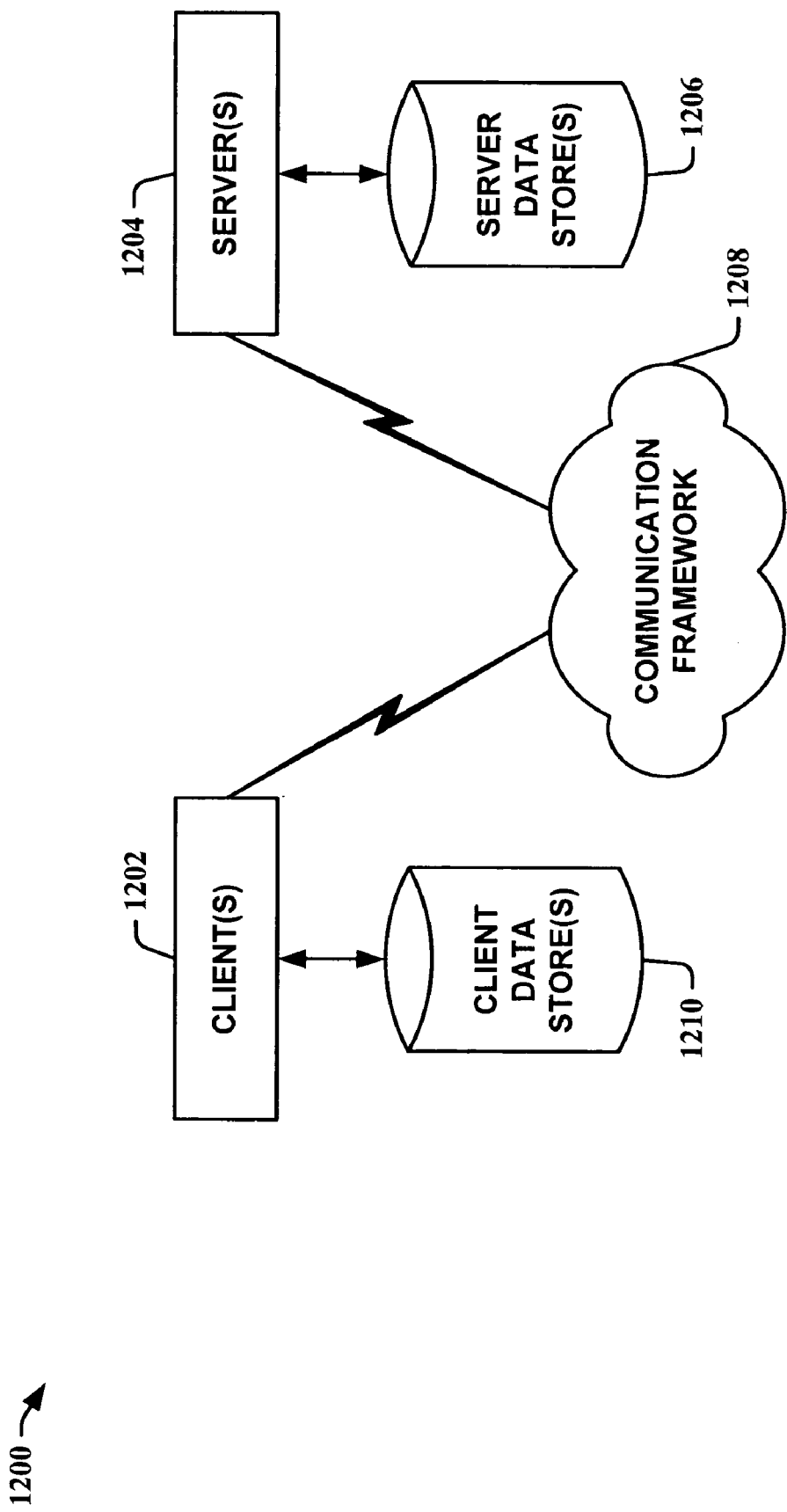
FIG. 12 illustrates another example operating environment in which an embodiment can function.

FIG. 12 is another block diagram of a sample computing environment 1200 with which embodiments can interact. The system 1200 further illustrates a system that includes one or more client(s) 1202. The client(s) 1202 can be hardware and/or software (e.g., threads, processes, computing devices). The system 1200 also includes one or more server(s) 1204. The server(s) 1204 can also be hardware and/or software (e.g., threads, processes, computing devices). One possible communication between a client 1202 and a server 1204 may be in the form of a data packet adapted to be transmitted between two or more computer processes. The system 1200 includes a communication framework 1208 that can be employed to facilitate communications between the client(s) 1202 and the server(s) 1204. The client(s) 1202 are connected to one or more client data store(s) 1210 that can be employed to store information local to the client(s) 1202. Similarly, the server(s) 1204 are connected to one or more server data store(s) 1206 that can be employed to store information local to the server(s) 1204.

It is to be appreciated that the systems and/or methods of the embodiments can be utilized in email classification facilitating computer components and non-computer related components alike. Further, those skilled in the art will recognize that the systems and/or methods of the embodiments are employable in a vast array of electronic related technologies, including, but not limited to, computers, servers and/or handheld electronic devices, and the like.

What has been described above includes examples of the embodiments. It is, of course, not possible to describe every conceivable combination of components or methodologies for purposes of describing the embodiments, but one of ordinary skill in the art may recognize that many further combinations and permutations of the embodiments are possible. Accordingly, the subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates classification of electronic mail, comprising:
    a memory having stored therein computer executable components; and
    a processor that executes the computer executable components that comprise:
        a feature detection component configured to detect a feature of an obtained email, wherein the feature detected includes length of the obtained email;
        an email classifier component configured to preprocess the obtained email by at least one of removing commented text that is invisible when reading the email or removing characters that are invisible when reading the email; and
        a first decision tree including a classification component configured to classify the obtained email, the first decision tree including the classification component comprising:
            a plurality of distinct email classifiers; and
            a second decision tree including a feature classifier configured to select a distinct email classifier of the plurality of distinct email classifiers based at least on the feature detected in the obtained email and a subset of features from the feature classifier included in the second decision tree such that the distinct email classifier selected from the plurality of distinct email classifiers comprises an optimum email classifier for classifying the obtained email in comparison with other distinct email classifiers of the plurality of distinct email classifiers;
            internal nodes of the first decision tree including the classification component correspond to the feature classifier; and
            leaf nodes of the first decision tree including the classification component represent probability values of the feature associated with the plurality of distinct email classifiers compared with one or more spam confidence thresholds.

2. The system of claim 1, wherein in the first decision tree including the classification component, the classification component is configured to determine whether the obtained email is spam based at least on the distinct email classifier of the plurality of distinct email classifiers, and a classification of the obtained email comprises at least one of move, delete, or ignore when the obtained email is determined not to be spam.

3. The system of claim 1, wherein the first decision tree including the classification component uses a linear classifier, and the linear classifier comprises at least one of a logistic-regression classifier or a support vector machine (SVM).

4. The system of claim 1, wherein in the first decision tree including the classification component, the classification component smoothes a classification result of the obtained email when training data is sparse by employing a classifier that is based at least on one other classifier used in at least one other node of the first decision tree to form a base model for branches of the first decision tree lacking training data.

5. The system of claim 1, wherein the first decision tree including the classification component employs a linear classifier constructed from compound features based at least on nodes of the first decision tree.

6. The system of claim 5, wherein:
    the compound features are based at least on at least one internal node of the first decision tree,
    the linear classifier corresponding to an internal node of the first decision tree is trained as a function of the data relevant to the internal node,
    the internal node is used to determine features of nodes below the internal node, and
    a classification result of the obtained email is based at least on the classifiers within the first decision tree that are on a path from a root node of the first decision tree to a leaf node of the first decision tree.

7. A device employing the system of claim 1, comprising at least one of a computer, a server or a handheld electronic device.

8. The system of claim 1, wherein the at least one feature comprises at least one of:
    a size of the obtained email,
    a size of font in the obtained email,
    whether a word is located in a subject line of the obtained email,
    whether the word is located in a body portion of the obtained email,
    whether an email has attachments,
    a percentage of non-alphanumeric characters in the body portion of an email,
    a percentage of non-alphanumeric characters in a subject area of an email,
    a number of recipients of an email,
    whether all letters of all words in a subject area or body of an email are capital letters, or a percentage of uppercase letters making up words in the body of an email.

9. A method for facilitating classification of electronic mail, wherein the method is performed by a processor that executes acts comprising:
obtaining an email from a source as an obtained email;
preprocessing the obtained email by at least one of removing commented text that is invisible when reading the email or removing characters that are invisible when reading the email;
classifying the obtained email, via a first decision tree including a classification component comprising a decision tree of at least one feature classifier; and
selecting, using a second decision tree of classifier models including a feature classifier, a distinct email classifier of a plurality of distinct email classifiers for detecting whether the obtained email is spam, the selecting being based at least on detected features of the obtained email and a subset of the features from the feature classifier included in the second decision tree, the distinct email classifier of the plurality of distinct email classifiers being tailored as an optimum email classifier for the obtained email in comparison with other distinct email classifiers of the plurality of distinct email classifiers, and the features of the obtained email comprising at least length of the obtained email.

10. The method of claim 9, further comprising:
employing a linear model as at least one classifier of the decision tree of classifier models, the at least one classifier being based on at least one of a logistic-regression model or a support vector machine (SVM) model.

11. The method of claim 9, further comprising:
employing another decision tree as at least one classifier of the decision tree.

12. The method of claim 9, further comprising:
smoothing a detection result using a classifier model that incorporates, at least in part, another classifier model built for another node of the decision tree of classifier models.

13. The method of claim 9, further comprising:
employing at least one linear model constructed from compound features that are based on, at least in part, nodes of the decision tree of classifier models.

14. The method of claim 13, further comprising:
constructing compound features based on, at least in part, at least one internal node of the decision tree of classifier models.

15. The method of claim 14, wherein a linear classifier corresponding to an internal node of the decision tree of classifier models is trained as a function of data relevant to the internal node, the internal node being used to determine features of nodes below the internal node, and a detection result of the email being based at least on all classifiers within the decision tree of classifier models that are on a path from a root node of the decision tree of classifier models to a leaf node of the decision tree of classifier models.

16. A device employing the method of claim 9, comprising at least one of a computer, a server, or a handheld electronic device.

17. The method of claim 9, further comprising:
partitioning the obtained email based at least on a type of text, such that:
in an event the type of text of the obtained email includes HyperText Markup Language (HTML), the obtained email is, classified as a first type of email,
in an event the type of text of the obtained email does not include HTML, the obtained email is classified as a second type of email,
in an event the obtained email is classified as the second type of email and the type of text of the obtained email includes plain text, the obtained email is classified as a first sub type of the second type of email, and
in an event the obtained email is classified as the second type of email and the type of text of the obtained email does not include plain text, the obtained email is classified as a second sub type of the second type of email.

18. The method of claim 9, wherein the features of the email further comprise at least one of word choice, sender, or subject line.

19. One or more computer readable media, wherein the computer readable media is not a signal and has physical structure the computer readable media having stored therein computer executable components, the computer executable components upon execution by a processor configuring a computer to perform operations comprising:
detecting features of an obtained email, wherein at least one feature of the features of the obtained email detected includes content encoding;
classifying the obtained email, via a first decision tree including a classification component comprising a decision tree of at least one feature classifier;
selecting a distinct email classifier of a plurality of distinct email classifiers via a second decision tree including a feature classifier, the selecting being based at least on the feature detected in the obtained email and a subset of features from the feature classifier included in the second decision tree; and
classifying the obtained email based at least on the features of the obtained email and the distinct email classifier of the plurality of distinct email classifiers selected via the second decision tree, wherein:
root and interior nodes of the second decision tree comprise tests on the features of the at least one obtained email;
leaf nodes of the second decision tree are associated with the plurality of distinct email classifiers; and
the distinct email classifier of the plurality of distinct email classifiers selected via the second decision tree is tailored as an optimum email classifier for the obtained email in comparison with other distinct email classifiers of the plurality of distinct email classifiers.

20. The one or more computer readable media having physical structure of claim 19, wherein the at least one obtained email comprises HyperText Markup Language (HTML) messages or plain text messages, wherein the HTML messages are separated from the plain text messages, and wherein different filters are applied to each group of separated messages to classify obtained emails.

* * * * *